US009921305B2

United States Patent
Cao et al.

(10) Patent No.: US 9,921,305 B2
(45) Date of Patent: *Mar. 20, 2018

(54) RADAR APPARATUS AND OBJECT SENSING METHOD

(71) Applicant: Panasonic Intellectual Property Management Co., Ltd., Osaka (JP)

(72) Inventors: Yunyun Cao, Tokyo (JP); Hirofumi Nishimura, Kanagawa (JP); Asako Hamada, Kanagawa (JP); Takaaki Kishigami, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 303 days.

This patent is subject to a terminal disclaimer.

(21) Appl. No.: 14/754,257

(22) Filed: Jun. 29, 2015

(65) Prior Publication Data
US 2016/0041260 A1     Feb. 11, 2016

(30) Foreign Application Priority Data

Aug. 5, 2014    (JP) ................................ 2014-159114

(51) Int. Cl.
    *G01S 13/42*      (2006.01)
    *G01S 7/292*      (2006.01)
    (Continued)

(52) U.S. Cl.
CPC .............. *G01S 13/42* (2013.01); *G01S 7/282* (2013.01); *G01S 7/285* (2013.01); *G01S 7/2927* (2013.01);
(Continued)

(58) Field of Classification Search
CPC .................. G01S 13/42; G01S 13/931; G01S 2013/0245; G01S 7/2813; G01S 7/292; G01S 13/48; G01S 13/685
(Continued)

(56) References Cited

U.S. PATENT DOCUMENTS

| | | | | |
|---|---|---|---|---|
| 9,689,983 B2 * | 6/2017 | Cao | ....................... | G01S 13/931 |
| 2010/0214152 A1 * | 8/2010 | Huang | ..................... | G01S 7/025 |
| | | | | 342/29 |
| 2013/0314268 A1 | 11/2013 | Fukuda | | |

FOREIGN PATENT DOCUMENTS

| | | |
|---|---|---|
| EP | 2 045 877 A1 | 4/2009 |
| JP | 60-122381 | 6/1985 |

(Continued)

OTHER PUBLICATIONS

Extended European Search Report dated Jan. 7, 2016, for corresponding EP Application No. 15174798.7-1812, 11 pages.
Wicks et al., "Optimized Detection of Spatially Extended Fixed Objects in Clutter", IEEE Radar Conference, Pasadena, CA, May 4-8, 2009, 6 pages.

*Primary Examiner* — Timothy A Brainard
(74) *Attorney, Agent, or Firm* — Seed IP Law Group LLP

(57) ABSTRACT

A radar apparatus includes an antenna that receives echo signals, each of the echo signals being a radar signal reflected by one or more objects; a Doppler-frequency acquirer that acquires Doppler frequencies at each range bin from the received echo signals; a direction correlation power-value calculator that calculates direction correlation power values for respective combinations of the Doppler frequencies and at least one of a distance to the one or more objects and an arrival direction of the echo signals, each direction correlation power value indicating a strength of a corresponding echo signal; and a normalized direction correlation-value calculator that calculates, for the respective combinations, normalized direction correlation values, each normalized direction correlation value indicating a probability of the arrival direction of the corresponding echo signal.

8 Claims, 21 Drawing Sheets

(51) Int. Cl.
  *G01S 7/40* (2006.01)
  *G01S 13/28* (2006.01)
  *G01S 13/522* (2006.01)
  *G01S 13/58* (2006.01)
  *G01S 13/72* (2006.01)
  *G01S 13/93* (2006.01)
  *G01S 7/282* (2006.01)
  *G01S 7/285* (2006.01)
  *G01S 13/02* (2006.01)

(52) U.S. Cl.
  CPC ............ *G01S 7/4026* (2013.01); *G01S 13/28* (2013.01); *G01S 13/284* (2013.01); *G01S 13/522* (2013.01); *G01S 13/584* (2013.01); *G01S 13/726* (2013.01); *G01S 13/931* (2013.01); *G01S 2013/0245* (2013.01)

(58) Field of Classification Search
  USPC ........................................................ 342/147
  See application file for complete search history.

(56) References Cited

FOREIGN PATENT DOCUMENTS

| | | |
|---|---|---|
| JP | 2011-180030 | 9/2011 |
| JP | 2011-180030 A | 9/2011 |

\* cited by examiner

FIG. 9
620

| | 1ST RANGE BIN | 2ND RANGE BIN | ... | kTH RANGE BIN | ... | KTH RANGE BIN | ONE FRAME |
|---|---|---|---|---|---|---|---|
| 1ST CYCLE | CI(1, 1) | CI(1, 2) | ... | CI(1, k) | ... | CI(1, K) | |
| 2ND CYCLE | CI(2, 1) | CI(2, 2) | ... | CI(2, k) | ... | CI(2, K) | |
| ... | ... | ... | ... | ... | ... | ... | |
| mTH CYCLE | CI(m, 1) | CI(m, 2) | ... | CI(m, k) | ... | CI(m, K) | |
| ... | ... | ... | ... | ... | ... | ... | |
| MTH CYCLE | CI(M, 1) | CI(M, 2) | ... | CI(M, k) | ... | CI(M, K) | |
| (M+1)TH CYCLE | CI(M+1, 1) | CI(M+1, 2) | ... | CI(M+1, k) | ... | CI(M+1, K) | |
| ... | ... | ... | ... | ... | ... | ... | |

FIG. 14
640

| | 1ST RANGE BIN | 2ND RANGE BIN | ... | kTH RANGE BIN | ... | KTH RANGE BIN |
|---|---|---|---|---|---|---|
| 1ST DOPPLER FREQUENCY | Fd(1, 1) | Fd(1, 2) | ... | Fd(1, k) | ... | Fd(1, K) |
| 2ND DOPPLER FREQUENCY | Fd(2, 1) | Fd(2, 2) | ... | Fd(2, k) | ... | Fd(2, K) |
| ... | ... | ... | ... | ... | ... | ... |
| mTH DOPPLER FREQUENCY | Fd(m, 1) | Fd(m, 2) | ... | Fd(m, k) | ... | Fd(m, K) |
| ... | ... | ... | ... | ... | ... | ... |
| MTH DOPPLER FREQUENCY | Fd(M, 1) | Fd(M, 2) | ... | Fd(M, k) | ... | Fd(M, K) |
| ... | ... | ... | ... | ... | ... | ... |

ONE FRAME

650

RADAR APPARATUS AND OBJECT SENSING METHOD

BACKGROUND

Technical Field

The present disclosure relates to a radar apparatus and an object sensing method.

Description of the Related Art

Technologies for sensing an object (target) by using a radar apparatus are disclosed in, for example, Japanese Unexamined Patent Application Publication No. 60-122381 (hereinafter referred to as "Patent Document 1") and Japanese Unexamined Patent Application Publication No. 2011-180030 (hereinafter referred to as "Patent Document 2").

In the technology disclosed in Patent Document 1, radar reception waves (reception signals) including reflected waves from an object and ground clutter, which refers to reflected waves from the ground surface, are sampled for each range bin, and Doppler components of the reception signals are determined for each range bin. The range bin is a unit of processing for a distance on which searching is to be performed. In the technology disclosed in Patent Document 1, the magnitude of changes in the power value (a Doppler component) of the reception signals in a Doppler frequency domain is compared with a predetermined threshold. In this technology, even in a case in which there is an influence of ground clutter, when the power of a frequency component is larger than that of the surroundings, the power of the frequency component can be sensed as an object in a Doppler frequency domain.

In the technology disclosed in Patent Document 2, a phase difference between peak frequencies of beat signals of a plurality of receiving antennas is calculated. In the technology disclosed in Patent Document 2, the direction of an object is calculated based on the calculated phase difference between the receiving antennas and a relative positional relationship of the receiving antennas. According to this technology, it is possible to sense individual objects that are located in different directions.

However, in the technologies disclosed in Patent Documents 1 and 2 (hereinafter referred to as "related art"), It is difficult to detect an object whose reflected power is small, and is located in the direction in which another object is also located. Thus, for example, when a human, which is an object having a small reflected power, is located in the vicinity of a vehicle, which is an object having a large reflected power, it is difficult for the related art to detect the human separately from the vehicle. That is, in the related art, there are cases in which a plurality of objects cannot be individually sensed.

BRIEF SUMMARY

One non-limiting and exemplary embodiment provides a radar apparatus and an object sensing method that can more reliably sense each of a plurality of objects.

In one general aspect, the techniques disclosed here feature a radar apparatus. The radar apparatus includes an antenna that receives echo signals, each echo signal being a radar signal reflected by one or more objects; a Doppler-frequency acquirer that acquires Doppler frequencies at each range from the received echo signals; a direction correlation power-value calculator that calculates direction correlation power values for respective combinations of the Doppler frequencies and at least one of a distance to the one or more objects and an arrival direction of the echo signals, each direction correlation power value indicating a strength of a corresponding echo signal; and a normalized direction correlation-value calculator that calculates, for the respective combinations, normalized direction correlation values, each normalized direction correlation value indicating a probability of the arrival direction of the corresponding echo signal.

According to the present disclosure, it is possible to more reliably sense each of a plurality of objects.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 9 is a table illustrating one example of the structure of delay profile data in the present embodiment;

FIG. 14 is a table illustrating one example of the configuration of Doppler frequency data in the present embodiment;

DETAILED DESCRIPTION

One embodiment of the present disclosure will be described below in detail with reference to the accompanying drawings.

<Overview of Object Sensing in Present Embodiment>

First, a description will be given of an overview of object sensing in the present embodiment.

Figure 1:
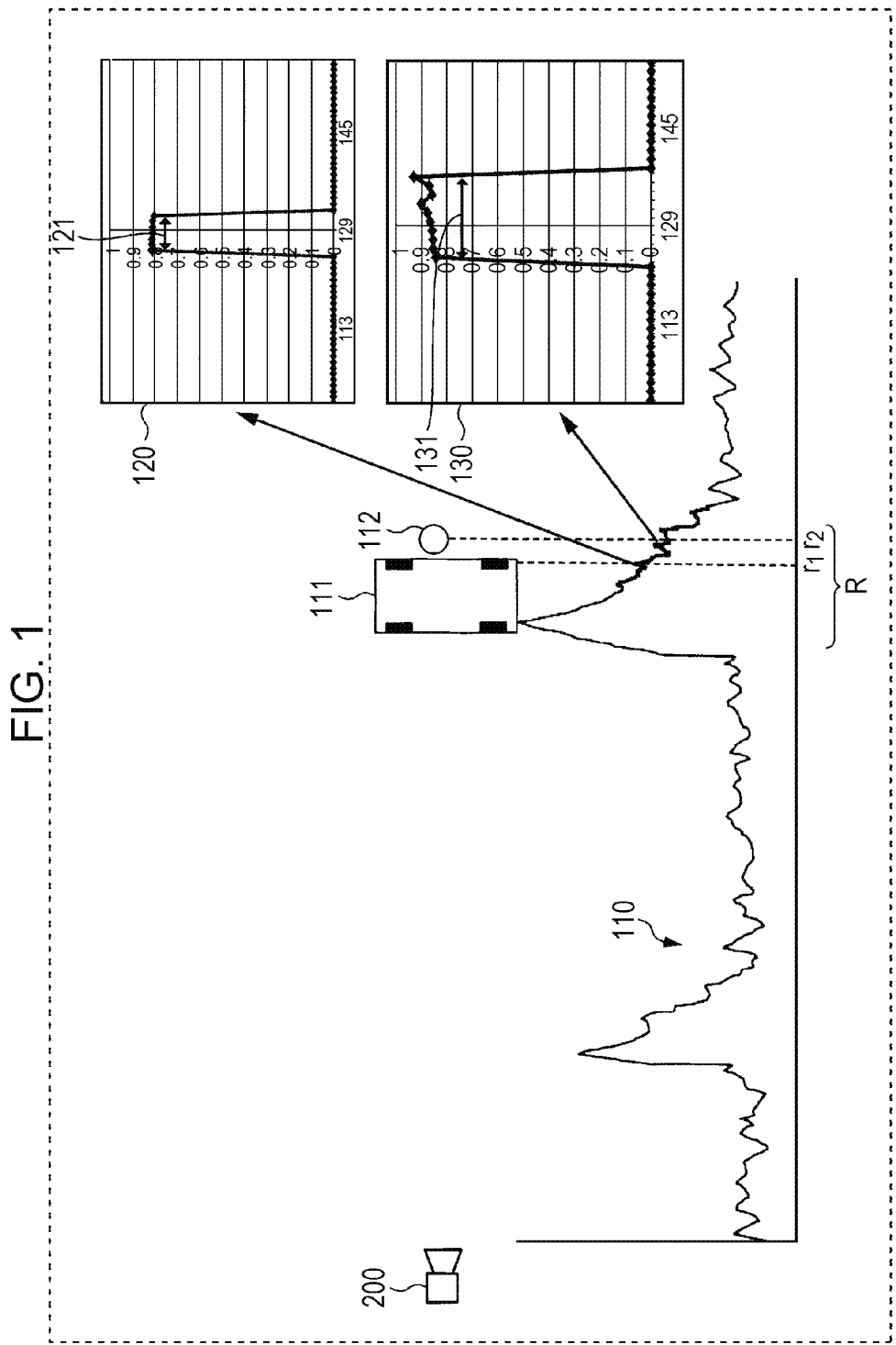
FIG. 1 is a diagram illustrating an overview of the principle of object sensing in an embodiment.

FIG. 1 is a diagram illustrating an overview of object sensing in the present embodiment.

In FIG. 1, a delay profile 110 is one example of a delay profile when a pedestrian 112 is beside a vehicle 111. In the delay profile 110, the horizontal axis indicates a distance from a radar apparatus, and the vertical axis indicates the power of an echo signal (a reception signal) received by the radar apparatus (this power is hereinafter simply referred to as "power").

In the following description, the distance from a radar apparatus 200 is represented using a range bin, which is a unit obtained by dividing a distance on which the radar apparatus performs sensing. The vehicle 111 is located in a first range bin $r_1$, and the pedestrian 112 is located at a second range bin $r_2$.

In FIG. 1, a first graph 120 shows a relationship between a Doppler frequency and a normalized direction correlation value at the first range bin $r_1$. A second graph 130 shows a relationship between a Doppler frequency and a normalized direction correlation value at the second range bin $r_2$. In the first and second graphs 120 and 130, the horizontal axis indicates the number of the Doppler frequency, and the vertical axis indicates a normalized direction correlation value.

In this case, the Doppler frequency is information of frequency variations that occur in an echo signals which is caused by the Doppler effect, when relative movement in a distance direction exists between an object that reflects the transmission signal and the radar apparatus 200, and is a frequency indicating the relative speed of the object in the distance direction relative to the radar apparatus 200.

The normalized direction correlation value is a value indicating a result obtained by normalizing, for each azimuth of interest, a correlation between a direction vector representing a complex number response of each receiving antenna element of an array antenna and a correlation vector representing a reception signal of each receiving antenna element by using two norms of the correlation vector. The normalized direction correlation value is a function of an azimuth and is a parameter indicating the probability that a direction of interest is the arrival direction of an echo signal. When the number of objects that are located at a range bin of interest and that have a Doppler speed of interest is one (which is called a one-wave model) with respect to the Doppler speed, the normalized direction correlation value takes a larger value as the physical reflection area of an object becomes smaller. Thus, as illustrated in the first and second graphs 120 and 130, the normalized direction correlation-value takes a large value at a Doppler frequency for the range bin $r_2$ where the small object is located, the Doppler frequency corresponding to a speed component of the object. Details of the normalized direction correlation value are described later.

In the delay profile 110, the power takes a large value in a range R where the vehicle 111 and the pedestrian 112 are present. Accordingly, for example, by using the related art and based on the power, the radar apparatus 200 can determine that an object is located in the range R. However, in a case in which the pedestrian 112 is located in close proximity to the vehicle 111, as illustrated in FIG. 1, it is difficult to separate the region in which the vehicle 111 is located and the region in which the pedestrian 112 is located, by using the waveform of the delay profile 110.

In this respect, the present disclosure have paid attention to a difference between Doppler spread of the pedestrian 112 and Doppler spread of the vehicle 111.

The "Doppler spread" as used herein refers to the number of Doppler frequency components included in echo signals, which are radar signals reflected by an object, and also refers to the range of speed components of the object. Portions, such as the trunk and limbs, of an object having joints, such as a human, an animal, or a robot, move at different speeds or in different directions. Thus, in such an object, different speed components (different Doppler frequency components) are generated at individual portions of the body, and the Doppler spread thereof is greater than that of objects, such as vehicles and buildings.

The Doppler spread of the pedestrian 112 is greater than the Doppler spread of the vehicle 111. Thus, a width 131 of the spread of a Doppler frequency at which the normalized direction correlation value at the second range bin $r_2$ is high is larger than a width 121 of the spread of a Doppler frequency at which the normalized direction correlation value at the first range bin $r_1$ is high.

On the basis of the foregoing knowledge, the radar apparatus 200 according to the present embodiment is configured so as to calculate the width of the spread of a Doppler frequency at which the normalized direction correlation value is high and so as to determine the boundary between the first range bin $r_1$ and the second range bin $r_2$.

That is, in object sensing in the present embodiment, a determination is made as to whether or not the width of the spread of a Doppler frequency at which the normalized direction correlation value exceeds a first threshold exceeds a second threshold. In the object sensing in the present embodiment, based on a result of the determination, the range bin R (distance) where an object is located is separated into the first range bin $r_1$ where the vehicle 111 is located and the second range bin $r_2$ where the pedestrian 112 is located and senses, for example, the presence and the position of the pedestrian 112.

<Configuration of Radar Apparatus>

Next, a description will be given of the configuration of the radar apparatus 200 according to the present embodiment.

Figure 2:
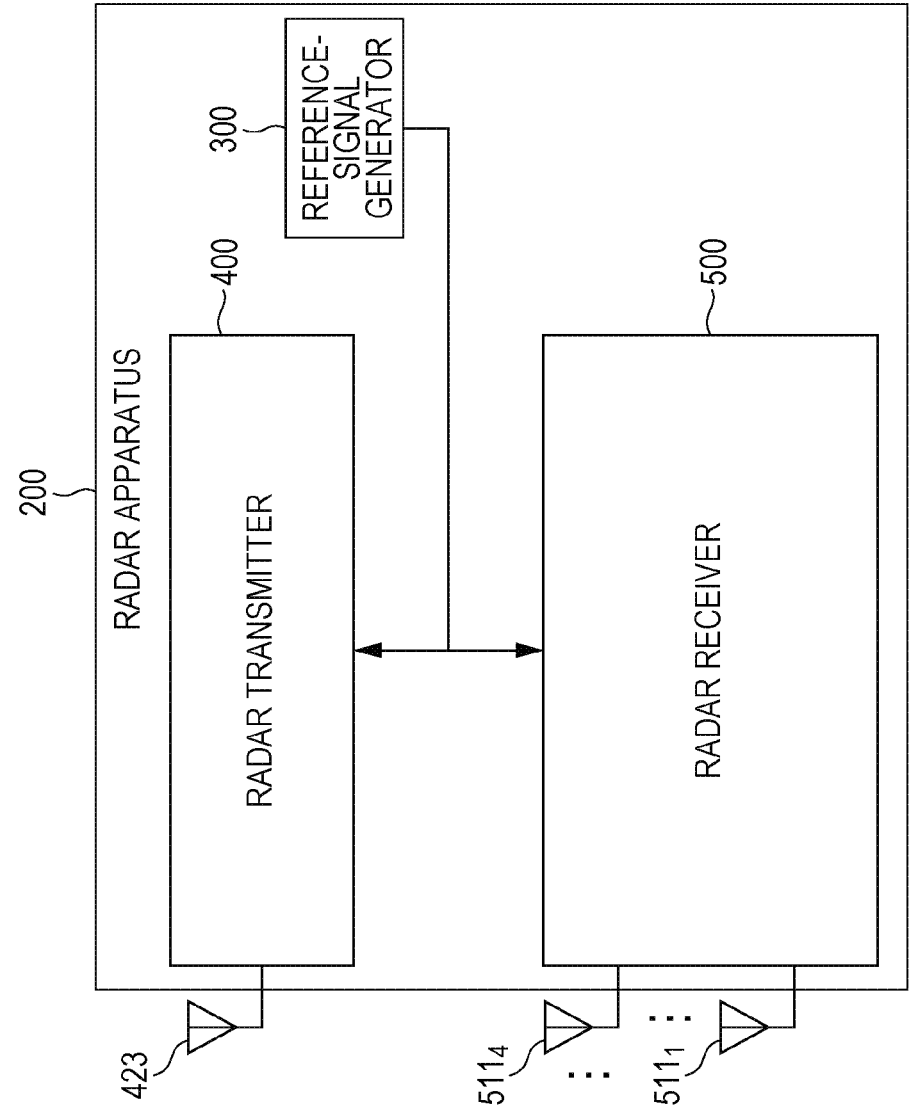
FIG. 2 is a block diagram illustrating one example of the configuration of a radar apparatus according to the present embodiment.

FIG. 2 is a block diagram illustrating one example of the configuration of the radar apparatus 200.

As illustrated in FIG. 2, the radar apparatus 200 has a reference-signal generator 300, a radar transmitter 400, and a radar receiver 500.

The reference-signal generator 300 is connected to the radar transmitter 400 and the radar receiver 500. The reference-signal generator 300 generates a reference signal and supplies the generated reference signal to both the radar transmitter 400 and the radar receiver 500. That is, the reference-signal generator 300 causes processing of the radar transmitter 400 and processing of the radar receiver 500 to synchronize with each other.

On the basis of the reference signal, the radar transmitter 400 generates a high-frequency radar signal and outputs the generated radar signal via a transmitting antenna 423.

The radar receiver 500 receives echo signals (reflected wave signals), which are a radar signal reflected by an object (a target), via first to fourth receiving antenna elements $511_1$ to $511_4$. On the basis of the reference signal, the radar receiver 500 performs predetermined signal processing and data processing on first to fourth reception signals, which are the echo signals received by the first to fourth receiving antenna elements $511_1$ to $511_4$, to sense an object.

Figure 3:
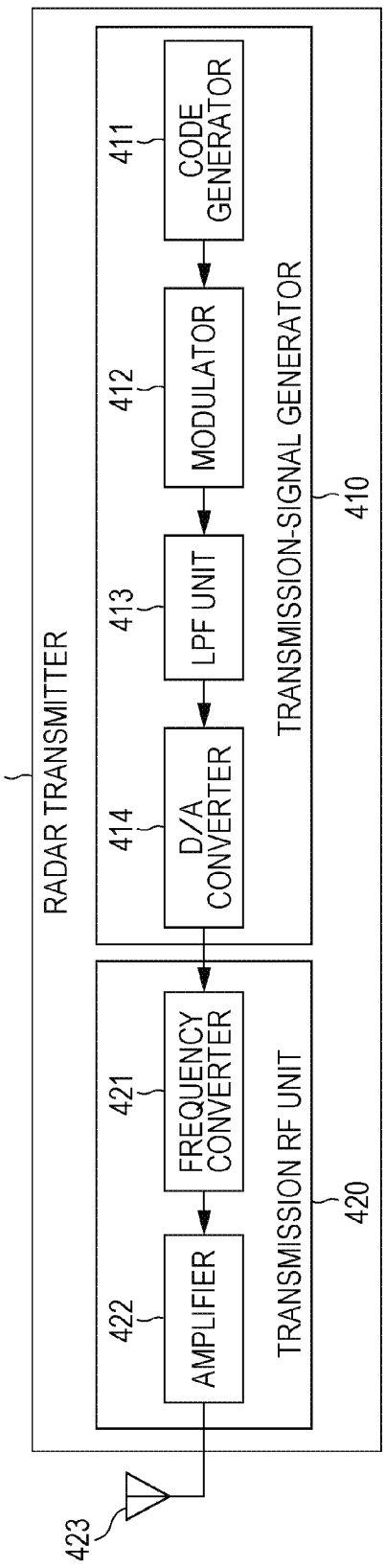
FIG. 3 is a block diagram illustrating one example of the configuration of a radar transmitter in the present embodiment.

FIG. 3 is a block diagram illustrating one example of the configuration of the radar transmitter 400.

As illustrated in FIG. 3, the radar transmitter 400 has a transmission-signal generator 410 and a transmission radio-frequency (RF) unit 420. The transmission-signal generator 410 and the transmission RF unit 420 operate based on a signal obtained by multiplying the reference signal by different multiples or the same multiple.

The transmission-signal generator 410 generates a transmission signal, which is an encoded pulse signal, and outputs the generated transmission signal to the transmission RF unit 420. Details of the transmission signal generated by the transmission-signal generator 410 are described later. The transmission-signal generator 410 has a code generator 411, a modulator 412, a low-pass filter (LPF) unit 413, and a digital/analog (D/A) converter 414.

The code generator 411 generates a predetermined transmission code and outputs the generated transmission code to the modulator 412.

The modulator 412 pulse-modulates the input transmission code to generate a transmission signal and outputs the generated transmission signal to the LPF unit 413.

The LPF unit 413 outputs, of the input transmission signal, digital signal components lower than or equal to a pre-set limit band to the D/A converter 414. The LPF unit 413 may be provided at a subsequent stage of the D/A converter 414.

The D/A converter 414 converts the input digital transmission signal into an analog transmission signal and outputs the analog transmission signal to the transmission RF unit 420.

The transmission RF unit 420 up-converts the input transmission signal to generate a radar transmission signal in a carrier frequency band (e.g., a millimeter wave band) and outputs the radar transmission signal to the transmitting antenna 423. The transmitting antenna 423 radiates the radar transmission signal, generated by the transmission RF unit 420, into space around the radar apparatus 200 as the radar signal (radar transmission signal). The transmission RF unit 420 has a frequency converter 421, an amplifier 422, and the transmitting antenna 423.

The frequency converter 421 up-converts an input transmission signal to generate a transmission signal in a carrier frequency band (e.g., a millimeter wave band). The frequency converter 421 then outputs the up-converted transmission signal to the amplifier 422. More specifically, the frequency converter 421 generates a transmission reference signal in a carrier frequency band, the transmission reference signal being obtained by multiplying the reference signal by a predetermined multiple. On the basis of the generated transmission reference signal, the frequency converter 421 up-converts the transmission signal.

The amplifier 422 amplifies the signal level of the input transmission signal to a predetermined signal level and outputs the resulting transmission signal to the transmitting antenna 423.

The transmitting antenna 423 radiates the input transmission signal into space around the radar apparatus 200 as the radar signal. The radar signal is reflected by an object and returns to the radar receiver 500 as echo signals.

Figure 4:
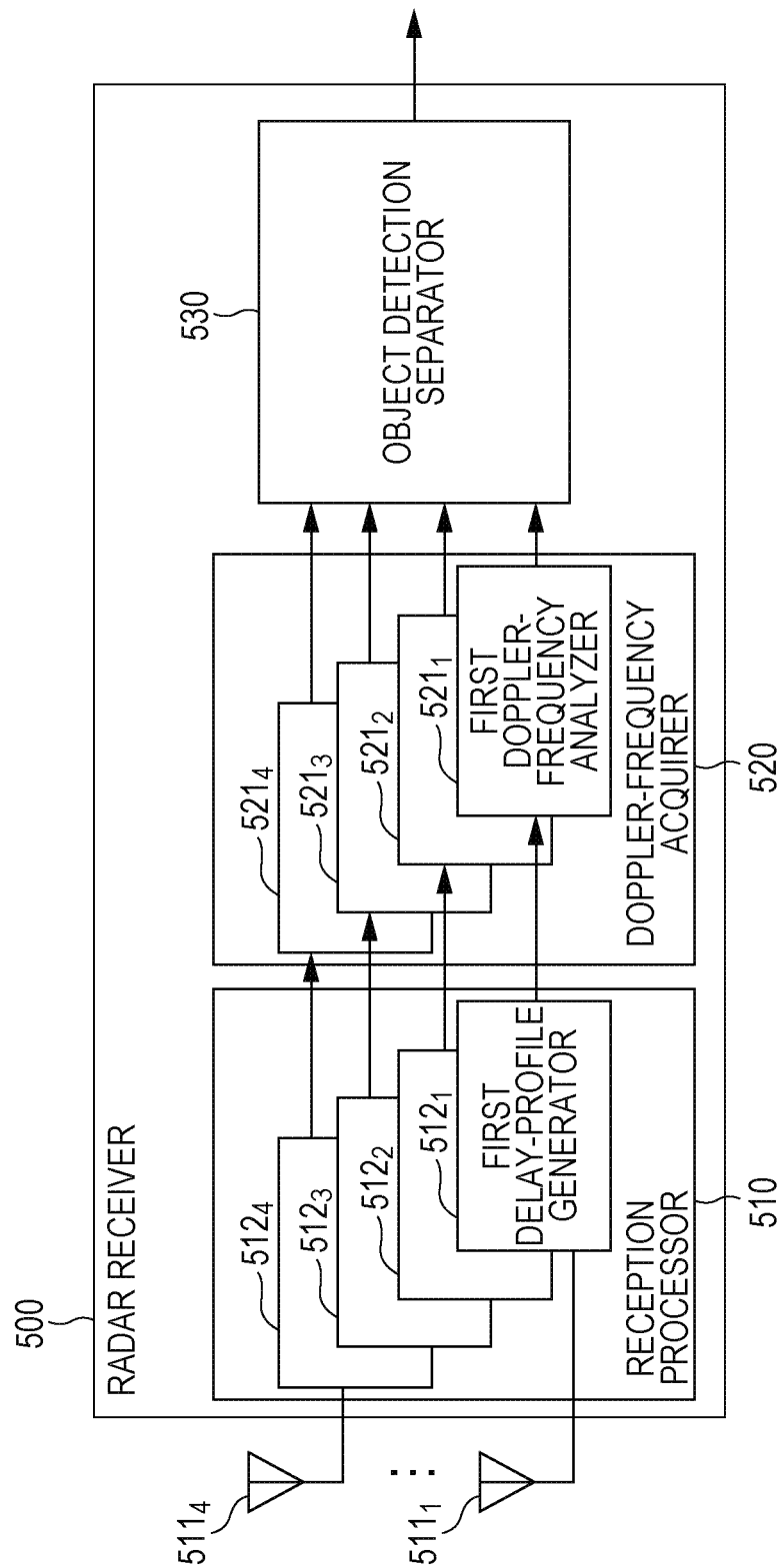
FIG. 4 is a block diagram illustrating one example of the configuration of a radar receiver in the present embodiment.

FIG. 4 is a block diagram illustrating one example of the configuration of the radar receiver 500.

In FIG. 4, the radar receiver 500 has a reception processor 510, a Doppler-frequency acquirer 520, and an object detection separator 530.

The reception processor 510 performs reception processing on echo signals. The reception processor 510 has the first to fourth receiving antenna elements $511_1$ to $511_4$, and first to fourth delay-profile generators $512_1$ to $512_4$.

The first to fourth receiving antenna elements $511_1$ to $511_4$ constitute an array antenna and are connected to the first to fourth delay-profile generators $512_1$ to $512_4$ on a one-to-one basis. Since the first to fourth receiving antenna elements $511_1$ to $511_4$ have substantially the same configuration, they are hereinafter referred to collectively as "receiving antenna elements 511", as appropriate. Also, since the first to fourth delay-profile generators $512_1$ to $512_4$ have substantially the same configuration, they are hereinafter referred to collectively as "delay-profile generators 512", as appropriate.

The receiving antenna elements 511 receive echo signals and output the received echo signals to the corresponding (connected) delay-profile generators 512 as reception signals.

The relative positional relationship of the first to fourth receiving antenna elements $511_1$ to $511_4$ is predetermined. When the first to fourth receiving antenna elements $511_1$ to $511_4$ receive echo signals from the same object, the first to fourth reception signals received by the first to fourth receiving antenna elements $511_1$ to $511_4$ have phase differences (hereinafter referred to as "inter-antenna phase differences") corresponding to the relative positional relationship. Details of the inter-antenna phase differences are described later.

The delay-profile generators 512 performs sampling on the input reception signals at each predetermined discrete time point (corresponding to each range bin) and calculates in-phase (I) signal data and quadrature (Q) signal data in the reception signals for each range bin. More specifically, each delay-profile generator 512 performs processing for correlation between the radar transmission signal and the reception signals, generates correlation signals including arrival delay information of the reception signals (the echo signals), and adding the correlation signals a predetermined number of times to thereby periodically generate an I/Q delay profile at intervals determined by a transmission period and the number of additions. Each delay-profile generator 512 outputs the generated I/Q delay profile (hereinafter referred to simply as a "delay profile") to the Doppler-frequency acquirer 520.

The delay-profile generator 512 operates based on a reception reference signal obtained by multiplying the reference signal by a predetermined multiple that is the same as that for the transmission RF unit 420. Thus, the processing of the transmission RF unit 420 synchronizes with processing of the delay-profile generator 512.

With respect to the respective first to fourth receiving antenna elements $511_1$ to $511_4$, the Doppler-frequency acquirer 520 analyzes the delay profiles and acquires Doppler frequencies at each range bin, based on the respective reception signals. The Doppler-frequency acquirer 520 has first to fourth Doppler-frequency analyzers $521_1$ to $521_4$.

The first to fourth Doppler-frequency analyzers $521_1$ to $521_4$ are connected to the first to fourth delay-profile generators $512_1$ to $512_4$ on a one-to-one basis. Since the first to fourth Doppler-frequency analyzers $521_1$ to $521_4$ have the same configuration, they are hereinafter referred to collectively as "Doppler-frequency analyzers 521", as appropriate.

The Doppler-frequency analyzers 521 analyze the input delay profiles to obtain Doppler frequencies at each range bin with respect to the reception signals received by the corresponding receiving antenna elements 511 (connected via the delay-profile generators 512). The Doppler-frequency analyzers 521 output data of the obtained series of Doppler frequencies (hereinafter referred to as "Doppler frequency data") to the object detection separator 530. The Doppler frequency data output by the first to fourth Doppler-frequency analyzers $521_1$ to $521_4$ are referred to as first to fourth Doppler frequency data, as appropriate.

The object detection separator 530 calculates direction correlation power values and the aforementioned normalized direction correlation values for respective combinations of Doppler frequencies and at least one of the distances (ranges) from the radar apparatus to an object and the arrival directions of the echo signals. The object detection separator 530 then senses an object that reflects the radar signal, based on the calculated direction correlation power values and normalized direction correlation values.

The "direction correlation power value" as used herein refers to the result of an inner product of a reception vector regarding reception signals at the receiving antenna elements of the array antenna and a direction vector representing complex responses of the receiving antenna elements when the reception signal arrives from a predetermined direction. That is, each direction correlation power value is a value indicating the strength of the power of the echo signal and taking into account the probability of a predetermined arrival direction of the echo signal.

Figure 5:
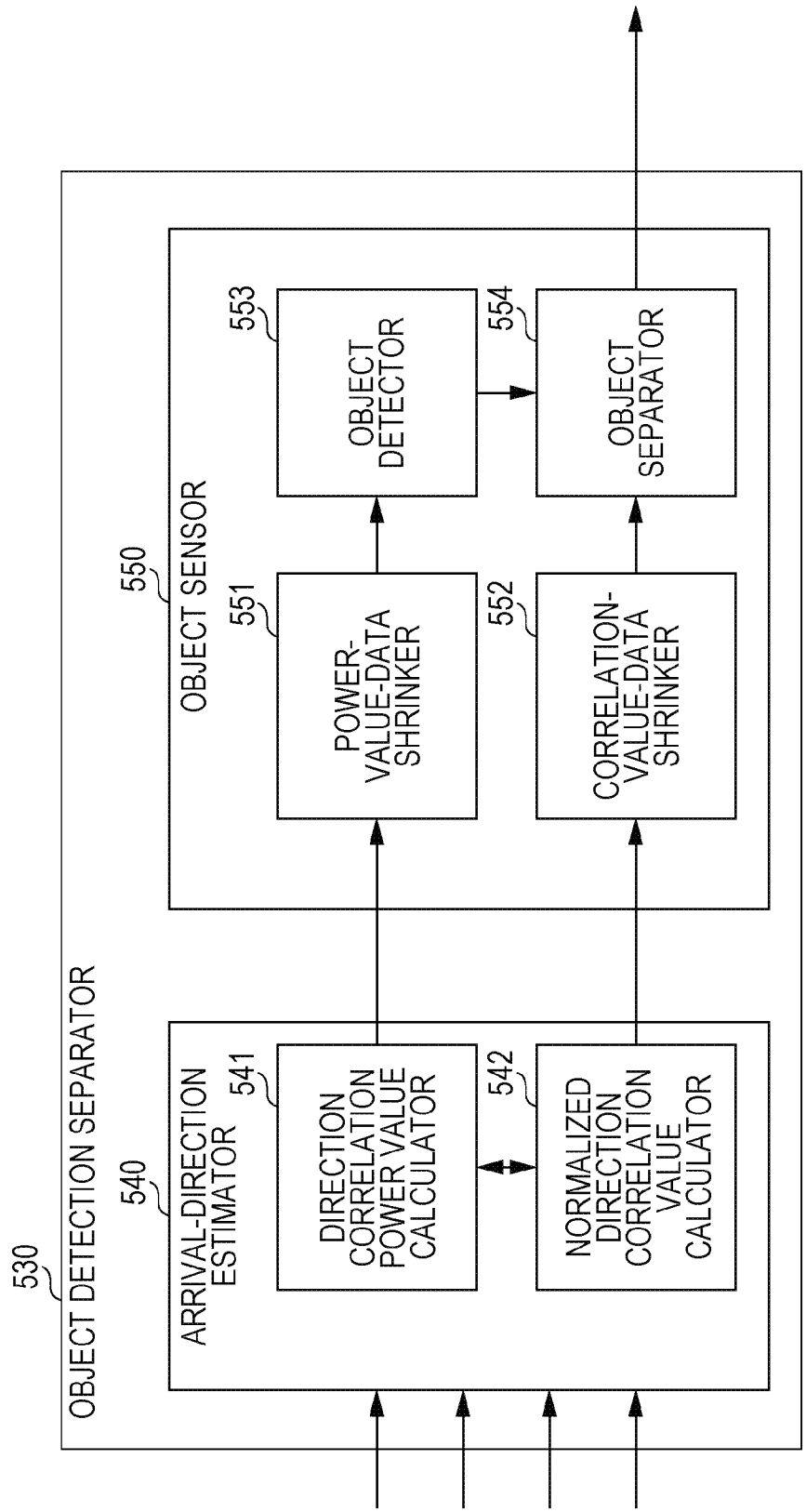
FIG. 5 is a block diagram illustrating one example of the configuration of an object detection separator in the present embodiment.

FIG. 5 is a block diagram illustrating one example of the configuration of the object detection separator 530.

In FIG. 5, the object detection separator 530 has an arrival-direction estimator 540 and an object sensor 550.

The arrival-direction estimator 540 estimates the arrival direction of echo signals (i.e., a direction in which an object is located), based on the first to fourth Doppler frequency data. The arrival-direction estimator 540 has a direction correlation power-value calculator 541 and a normalized direction correlation-value calculator 542.

Using the first to fourth Doppler frequency data and based on the relative positional relationship of the first to fourth receiving antenna elements $511_1$ to $511_4$, the direction correlation power-value calculator 541 calculates direction correlation power values for respective combinations of Doppler frequencies and at least one of the distances from the radar apparatus to an object and the arrival directions of the echo signals. In the present embodiment, it is assumed that the direction correlation power-value calculator 541 calculates direction correlation power values for respective combinations of the Doppler frequencies, the distances, and the directions. The direction correlation power-value calculator 541 then outputs data of the calculated series of direction correlation power values (this data is hereinafter referred to as "direction correlation power-value data") to the normalized direction correlation-value calculator 542 and the object sensor 550.

Using the first to fourth Doppler frequency data and the relative positional relationship of the first to fourth receiving antenna elements $511_1$ to $511_4$, the normalized direction correlation-value calculator 542 calculates normalized direction correlation values for respective combinations of Doppler frequencies and at least one of the distances from the radar apparatus to an object and the arrival directions of the echo signals. Each normalized direction correlation value is a parameter indicating the probability that a direction of interest is the arrival direction of the corresponding echo signal, as described above. In the present embodiment, it is assumed that the normalized direction correlation-value calculator 542 calculates normalized direction correlation values for the respective combination of the Doppler frequencies, the distances, and the directions. The normalized direction correlation-value calculator 542 then outputs data of the calculated series of normalized direction correlation values (the data is hereinafter referred to as "normalized direction correlation-value data") to the object sensor 550.

The object sensor 550 senses an object that reflects the radar signal, based on the input direction correlation power values and normalized direction correlation values. The object sensor 550 has a power-value-data shrinker 551, a correlation-value-data shrinker 552, an object detector 553, and an object separator 554.

The power-value-data shrinker 551 compresses the input direction correlation power-value data into data of direction correlation power values for the respective combinations of the Doppler frequencies and one of the distances from the radar apparatus to an object and the arrival directions of the echo signals. The power-value-data shrinker 551 then outputs the compressed direction correlation power-value data to the object detector 553.

The correlation-value-data shrinker 552 compresses the input normalized direction correlation-value data into data of normalized direction correlation values for the respective combinations of the Doppler frequencies and one of the distances from the radar apparatus to an object and the arrival directions of the echo signals. The correlation-value-data shrinker 552 then outputs the compressed normalized direction correlation-value data to the object separator 554.

Based on the input compressed direction correlation power-value data, the object detector 553 detects the presence of an object that reflects the radar signal and the position of the object. The object detected at this point is, for example, a group of the vehicle 111 and the pedestrian 112, and the position detected at this point is a region R in which the group of the vehicle 111 and the pedestrian 112 is present (see FIG. 1). The object detector 553 outputs information indicating the region in which the detected objects are present (e.g., information indicating a plurality of range bins and hereinafter referred to as "object region information") to the object separator 554.

Based on the input object position information and compressed normalized direction correlation-value data, the object separator 554 senses and separates objects that reflected the radar signal.

More specifically, with respect to each range bin, the object separator 554 determines whether or not the width of spread of a Doppler frequency at which the normalized direction correlation value exceeds a first threshold exceeds a second threshold. That is, the object separator 554 determines whether or not, in a range in which the Doppler frequency is relatively high, the normalized direction correlation value is continuously stable at a high value. Based on the result of the determination, the object separator 554 separates the region R into a first range bin $r_1$ (a first region) in which the vehicle 111 (a first object) is present and a second range bin $r_2$ (a second region) in which the pedestrian 112 (a second object) is present.

The object separator 554 may determine the boundary between the first range bin $r_1$ and the second range bin $r_2$, by using the condition that the difference between representative values (e.g., average values) of the normalized direction correlation values for adjacent range bins (or adjacent two regions) exceeds a third threshold.

With respect to each object, the object separator 554 calculates, as an object sensing result, at least one of the value of the range and the value of the direction in which the object is present and outputs information indicating the object sensing result to a display device, a sound output device, a recording medium, another information processing device, or the like (not illustrated).

Although not illustrated, the radar apparatus 200 has, for example, a central processing unit (CPU), a storage medium, such as a read only memory (ROM), in which a control program is stored, and a work memory, such as a random access memory (RAM). In this case, the functions of the above-described elements are realized by the CPU executing the control program. However, the hardware configuration of the radar apparatus 200 is not limited to such an example. For example, the functional units in the radar apparatus 200 may be realized as an integrated circuit (IC). The functional units may be individually integrated into single chips or at least one or all of the functional blocks may be integrated into a single chip.

The radar apparatus 200 having such a configuration can distinctively detect an object having large Doppler spread and an object having small Doppler spread.

Now, information generated by the radar apparatus 200 will be described in detail.

<Details of Transmission Signal>

The transmission-signal generator 410 may use, for example, an encoded pulse or a chirped pulse to generate a baseband transmission signal. In any case, the transmission signal is repeatedly transmitted in accordance with a predetermined transmission period. Now, a description will be given of a case in which the transmission-signal generator 410 uses an encoded pulse.

The code generator 411 generates transmission codes of a code sequence Cn (n is an integer of 1 to L) having a code length L (an integer of 1 or more) at each transmission period Tr. Elements of the code sequence Cn are constituted, for example, using two values [−1, 1] or four values [1, −1, j, −j], where j is an imaginary unit that satisfies $j^2=-1$.

It is desired that the transmission codes be realized by a code sequence with which the radar receiver 500 can obtain a low sidelobe characteristic. Examples of such a code sequence include a code sequence having a pair of complementary codes, a Barker code sequence, pseudorandom noise (PN) codes, a Golay code sequence, M-sequence codes, and a code sequence having Spano codes. The transmission codes of the code sequence Cn are hereinafter referred to as "transmission codes Cn", for convenience of description.

For generating a pair of complementary codes (e.g., a Golay code sequence or a Spano code sequence) as the transmission codes Cn, the code generator 411 uses two transmission periods (2Tr) to alternately generate transmission codes Pn and Qn to be paired at each transmission period. That is, the code generator 411 generates a transmission code Pn included in the pair of complementary codes in the mth transmission period and generates another transmission code Qn included in the pair of complementary codes in the subsequent (m+1)th transmission period. Similarly, the code generator 411 repeatedly generates transmission codes Pn and Qn in transmission periods subsequent to the (m+2)th transmission period.

The modulator 412 pulse-modulates the transmission codes Cn, generated by the code generator 411, to generate a baseband transmission signal. More specifically, the modulator 412 performs amplitude modulation, amplitude shift keying (ASK), or phase modulation (phase shift keying (PSK)).

Figure 6:
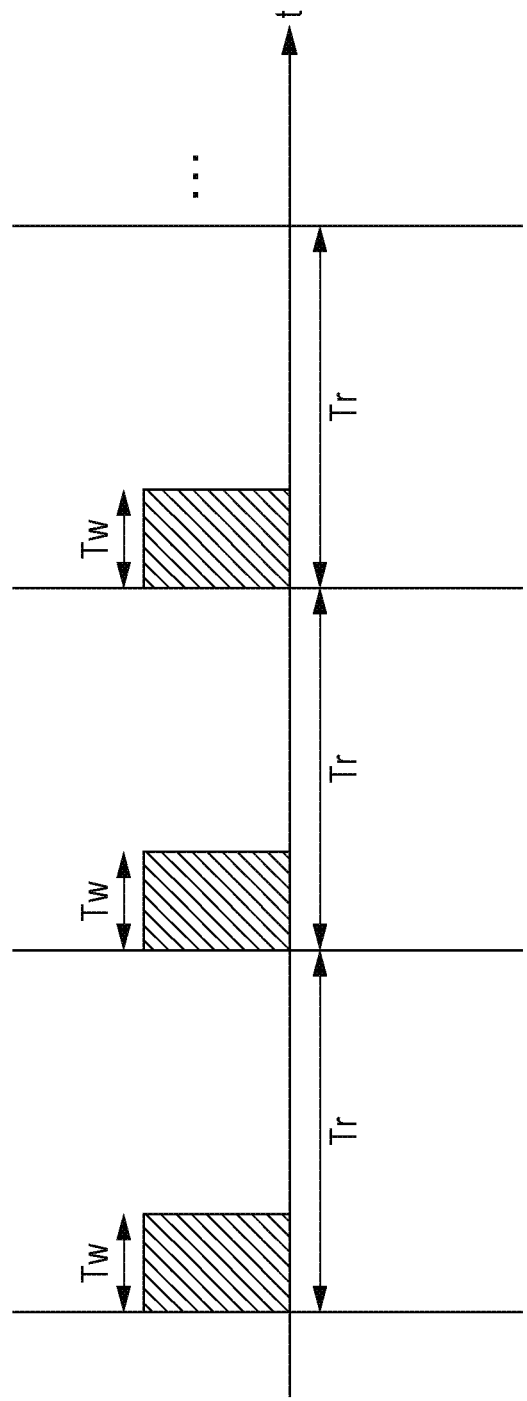
FIG. 6 is a diagram illustrating the relationship between a transmission section and a transmission periods in the present embodiment.
Figure 7:
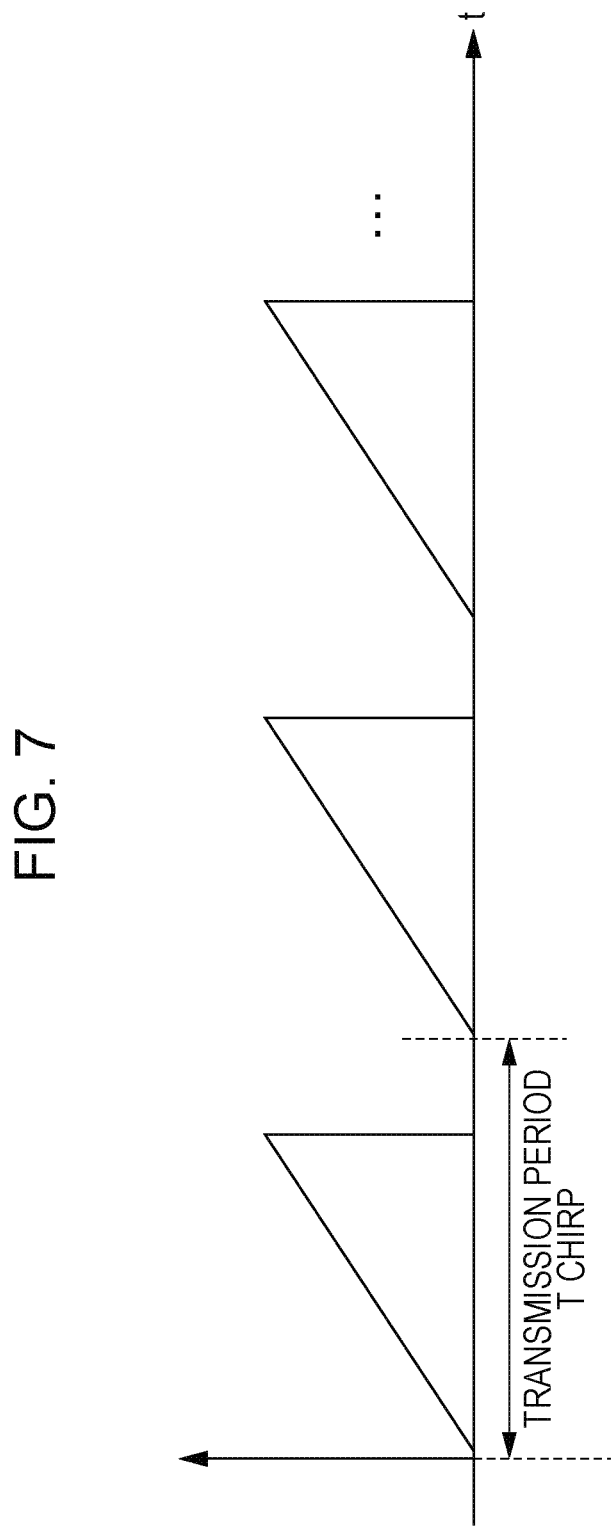
FIG. 7 illustrates one example of a process of frequency modulation of a transmission signal in the present embodiment.

FIG. 6 illustrates one example of transmission segments and transmission periods of a pulse-modulated transmission signal. In FIG. 6, the vertical axis indicates a frequency, and the horizontal axis indicates time. FIG. 7 illustrates one example when a chirped pulse is used, for reference.

The modulator 412 sets, for example, a transmission segment of Tw [second] for each transmission period Tr. Based on a transmission reference clock signal generated based on the reference signal, the modulator 412 performs modulation by using No samples for each transmission code Cn. That is, the sampling rate of the modulator 412 is given by (No×L)/Tw.

The modulator 412 performs modulation by using Nr (=No×L) samples in the transmission segment Tw (second) in each transmission period Tr. The modulator 412 also performs modulation using Nu samples in a signal-less segment (Tr−Tw) [second] in each transmission period Tr. As a result of the modulation, the radar signal is transmitted during the transmission segment Tw in the transmission period Tr and is not transmitted during the non-transmission segment (Tr−Tw).

The modulator 412 modulates the transmission codes Cn to thereby periodically generate a baseband transmission signal r (k, m), for example, given by equation (1):

$$r(k,m)=I(k,m)+jQ(k,m) \qquad (1)$$

where k indicates a discrete time point whose reference (k=1) is the start timing of the transmission period Tr, and takes a discrete value from 1 to Nr+Nu. That is, k indicates a time point indicating the generation timing (sample timing) of the transmission signal. Also, m indicates an ordinal number of the transmission period Tr, that is, the transmission cycle of the transmission codes Cn.

That is, the transmission signal r (k, m) indicates the value of the transmission signal at the discrete time point k in the mth transmission period Tr. More specifically, the transmission signal r (k, m) is a result obtained by adding an in-phase signal component I (k, m) and a quadrature signal component Q (k, m) multiplied by an imaginary unit j.

For example, when phase modulation (PSK) of two values [−1, 1] is used, the code sequence Cn is of binary phase shift keying (BPSK). Also, for example, when phase modulation of four values [1, −1, j, −j] is used, the code sequence Cn is of quadrature phase-shift keying (QPSK) or four-phase PSK. That is, in the case of phase modulation (PSK), predetermined modulation symbols in a constellation in an IQ plane are allocated.

<Relative Positional Relationship of Receiving Antenna Elements>

A relative positional relationship of the first to fourth receiving antenna elements $511_1$ to $511_4$ is pre-determined and is thus known.

Figure 8:
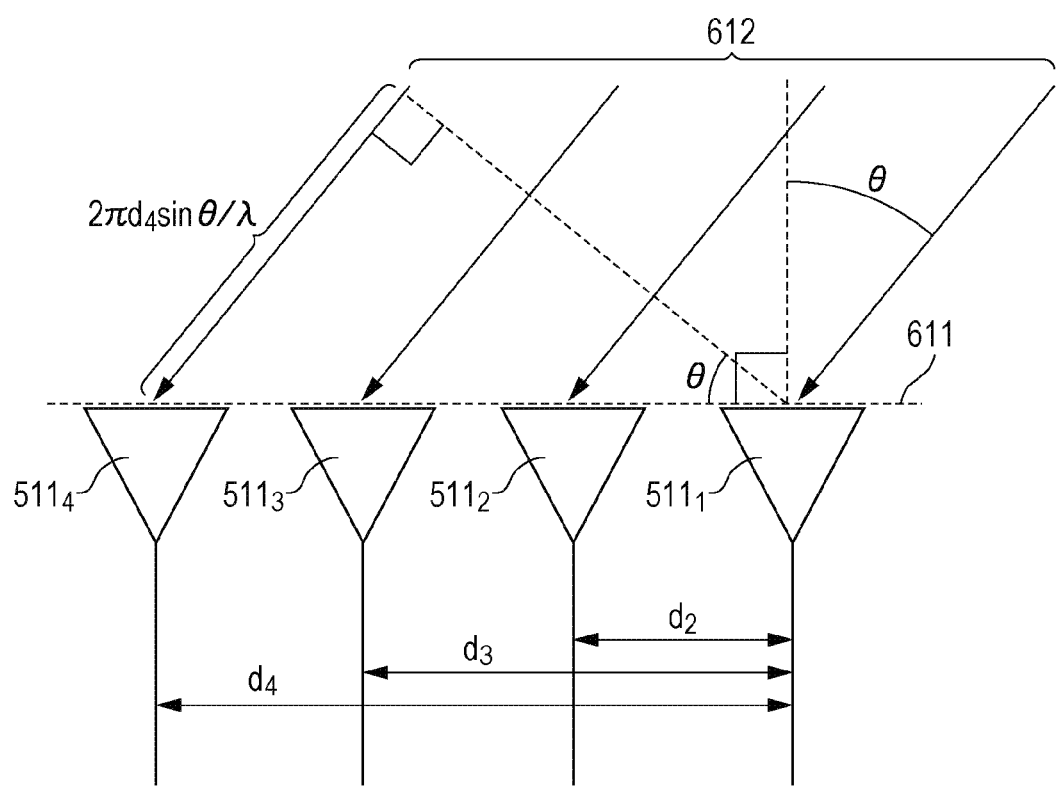
FIG. 8 is a diagram illustrating one example of a relative positional relationship of receiving antenna elements in the present embodiment.

FIG. 8 is a diagram illustrating one example of a relative positional relationship of the first to fourth receiving antenna elements $511_1$ to $511_4$ that constitute the array antenna.

As illustrated in FIG. 8, the first to fourth receiving antenna elements $511_1$ to $511_4$ are arranged, for example, in this order or along a straight line 611. The distance between the first receiving antenna element $511_1$ and the second receiving antenna element $511_2$ is represented by $d_2$, the distance between the first receiving antenna element $511_1$ and the third receiving antenna element $511_3$ is represented by $d_3$, and the distance between the first receiving antenna element $511_1$ and the fourth receiving antenna element $511_4$ is represented by $d_4$.

In this arrangement, it is assumed that an echo signal 612 having a wavelength λ has arrived from a direction of an angle θ relative to a direction orthogonal to the straight line 611. In this case, when the distance of the ith receiving antenna element $511_i$ from the first receiving antenna element $511_1$ is represented by $d_i$, the phase difference (the inter-antenna phase difference) between the reception signal of the ith antenna element $511_i$ and the reception signal of the first receiving antenna element $511_1$ is given by $2\pi f d_i \sin \theta/c = 2\pi d_i \sin \theta/\lambda$. In this case, c is a propagation speed, f is the frequency of an echo signal (a radar signal), and λ is the wavelength of the echo signal. For example, as illustrated in FIG. 8, the phase difference of the reception signal of the fourth receiving antenna element $511_4$ relative to the reception signal of the first receiving antenna element $511_1$ is given by $2\pi d_4 \sin \theta/\lambda$.

<Delay Profile Data>

Each delay-profile generator 512 performs sampling on the input reception signals at each predetermined discrete time point (range bin). The delay-profile generator 512 then calculates an in-phase (I) signal I data and a quadrature signal (Q) data for sampled signals. Based on the I data and Q data (hereinafter referred to as "data") for each range bin, it is possible to determine the distance from the radar apparatus 200 to an object that reflects the radar signal, a reflection strength thereof, and phase information and the power of the reception signal from the object.

The delay-profile generator 512 adds each of the I and Q data, which are results of the sampling, a predetermined number of times (this addition is referred to as "coherent addition") for each range bin to obtain I and Q data for one cycle. As a result of the coherent addition, white noise is reduced. The delay-profile generator 512 obtains the data for each repeated waveform of an echo signal, that is, for each period (i.e., cycle).

In the following description, data corresponding to the kth range bin in the mth cycle is represented by a symbol Cl(m, k). The data Cl(m, k) is given, for example, by equation (2):

$$Cl(m,k)=Cl\_I(m,k)+Cl\_Q(m,k) \qquad (2)$$

where Cl_I(m, k) is an in-phase signal and is a real number component of the data Cl(m, k). Cl_Q(m, k) is a quadrature signal and is an imaginary number component of data Cl(m, k). Also, the symbol k indicates the number of a range bin and takes an integer of k=1, 2, . . . , K. K is a maximum value of the number of the range bin. The maximum distance that can be measured by the radar apparatus 200 is determined by the value of K.

The delay-profile generator 512 outputs, as the delay profile data, a series of data obtained for each cycle and each range bin.

Figure 10:
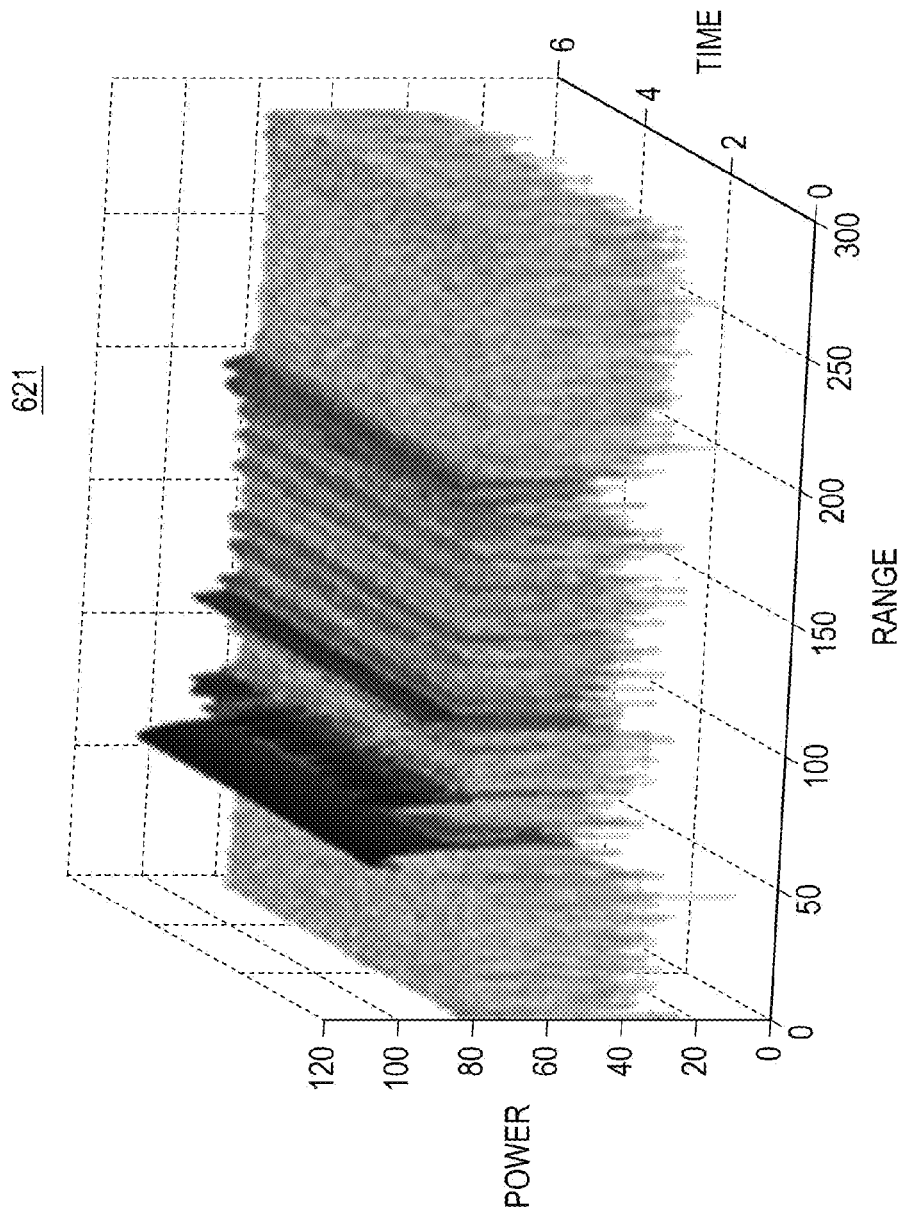
FIG. 10 illustrates one example of a three-dimensional graph of the delay profile data in the present embodiment.

FIG. 9 is a table illustrating one example of the structure of the delay profile data output by the delay-profile generator 512. FIG. 10 illustrates one example of a three-dimensional graph of the delay profile data. In FIG. 10, the horizontal axis indicates a distance (a range bin), the depth axis indicates time (a cycle), and the vertical axis indicates power $(\log_{10}(I^2+Q^2))$ of a corresponding component in a reception signal.

As illustrated in FIG. 9, delay profile data 620 has data Cl(m, 1) to Cl(m, K) of the first to Kth range bins for each cycle. As can also be seen from a three-dimensional graph 621 illustrated in FIG. 10, the delay profile data 620 is data indicating changes in power in space and changes in power with time.

Each time the delay profile data 620 for one cycle is generated, each delay-profile generator 512 sequentially outputs the generated one-cycle delay profile data 620 (e.g., data Cl(1, 1) to Cl(1, K) for the first to Kth range bins in a cycle) to the corresponding Doppler-frequency acquirer 520 at the subsequent stage.

With respect to the output delay profile data 620, the Doppler-frequency acquirer 520 processes the data Cl(1, 1) to Cl(M, K) in consecutive M cycles as one unit (hereinafter referred to as a "frame").

<Doppler Frequency Data>

The Doppler-frequency analyzer 521 combines the input delay profile data 620 (see FIG. 9) for each frame (i.e., for data for the consecutive M cycles) and performs Doppler frequency analysis. That is, the Doppler-frequency analyzer 521 performs, for example, Doppler frequency analysis on the data Cl(1, k), Cl(2, k), Cl(M, k) for the kth range bin in consecutive M cycles.

Figure 11:
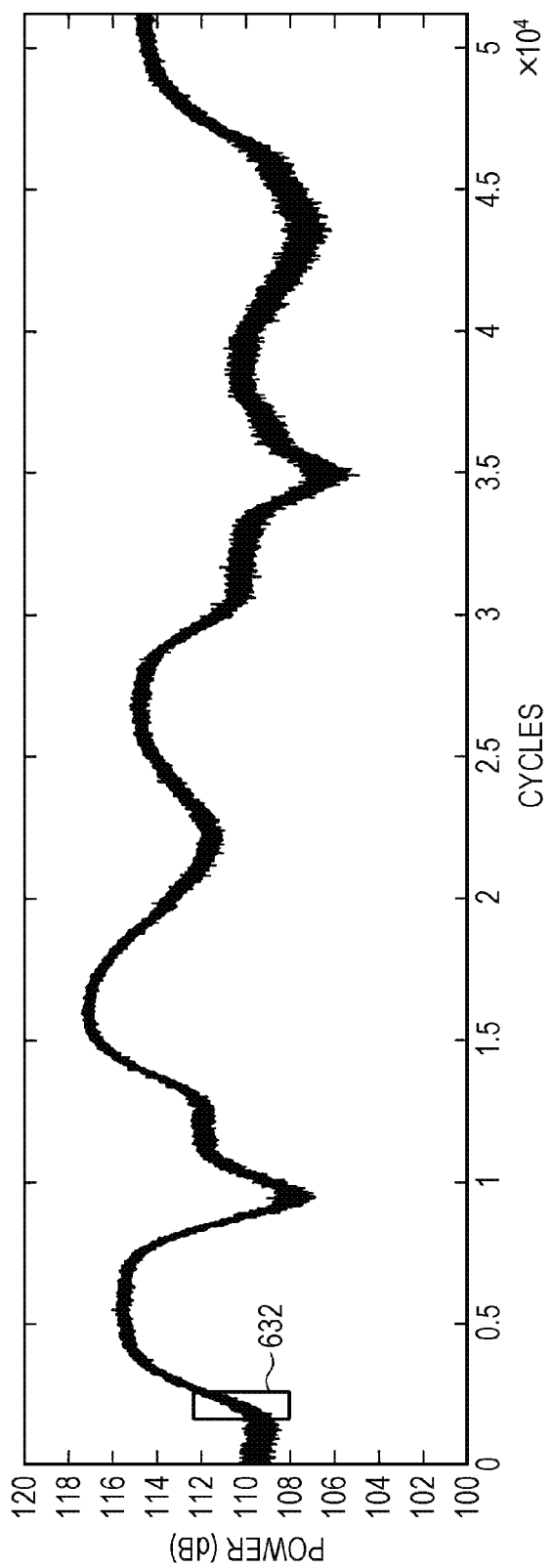
FIG. 11 illustrates one example of a two-dimensional graph of the delay profile data in the present embodiment.
Figure 12:
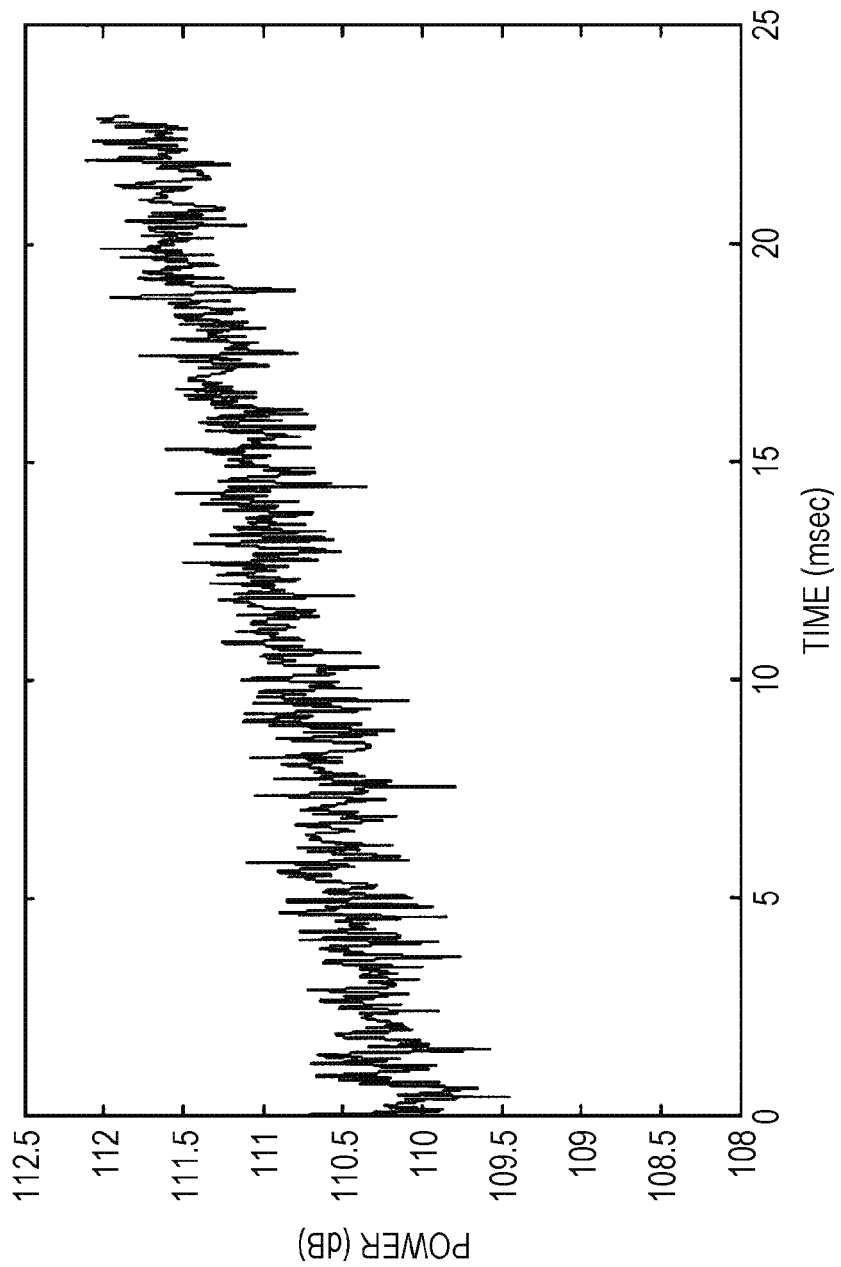
FIG. 12 is a partially enlarged graph of, in the present embodiment, the two-dimensional graph illustrated in FIG. 11.

FIG. 11 illustrates one example of a two-dimensional graph of the data of the kth range bin corresponding to a range in which a human is present, the data being included in the delay profile data to be subjected to the Doppler frequency analysis. FIG. 11 illustrates data for 51200 cycles (about 2.5 seconds). FIG. 12 is an enlarged graph of a portion 632 in the two-dimensional graph illustrated in FIG. 11. FIG. 12 illustrates data for 512 cycles (0.025 second). In FIGS. 11 and 12, the horizontal axis indicates a cycle (time), and the vertical axis indicates power (data) of a corresponding component in a reception signal.

As illustrated in FIG. 11, in delay profile data 631, data for the kth range bin changes significantly with time. This change is associated with movement of the person. Also, as can be seen from FIG. 12, which is an enlarged graph of the portion 632 corresponding to the segment of 512 cycles, the data fluctuates minutely. This minute fluctuation is due to minute human movement or fading.

The Doppler-frequency analyzer 521 performs Doppler frequency analysis to extract not only human movement but also speed components that are generated according to features of such minute human movement.

For example, a digital Fourier transform (DFT) can be used as a scheme for the Doppler frequency analysis. In the DFT, a calculator can perform high-speed calculation by using an algorithm for a fast Fourier transform (FFT).

Figure 13:
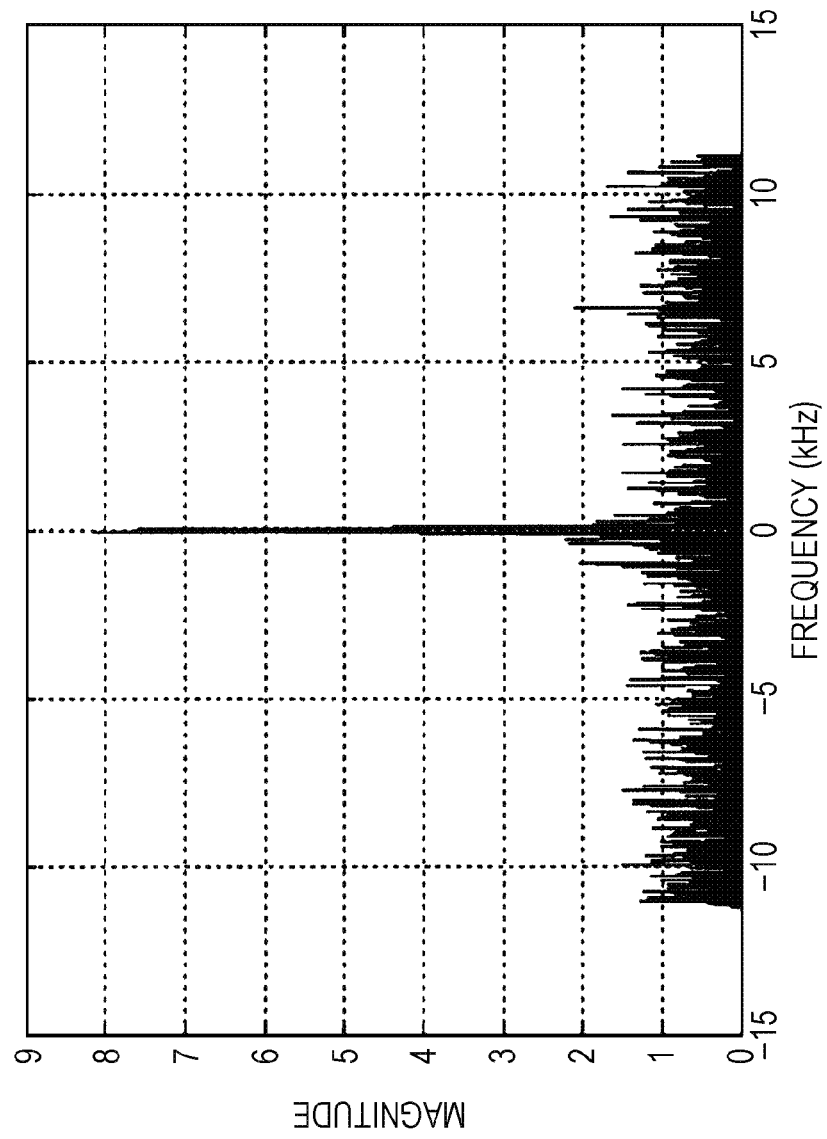
FIG. 13 is a graph illustrating one example of a result of FFT processing on the delay profile data in the present embodiment.

FIG. 13 is a graph illustrating one example of a result obtained by performing FFT processing on the data for 512 cycles in the kth range bin illustrated in FIG. 12. In FIG. 13, the horizontal axis indicates a frequency (a Doppler frequency), and the vertical axis indicates an intensity (power, a Doppler frequency component).

When DFT is used, the Doppler-frequency analyzer 521 performs a computational operation using complex numbers, by using $Cl\_I(m, k)$ as a real number component and using $Cl\_Q(m, k)$ as an imaginary number component. The Doppler frequency component $Fd(n, k)$ for a Doppler frequency having a number n with respect to the kth range bin is calculated, for example, by equation (3):

$$Fd(n, k) = \sum_{m=1}^{M} \left( Cl(m, k) e^{-j\frac{2\pi(n-1)(m-1)}{M}} \right) \quad (3)$$

where n indicates the number of a Doppler frequency and takes, for example, a value of 0, 1, ..., M (M is a positive integer). M is a maximum number of a Doppler frequency that can be measured by the radar apparatus 200. The Doppler frequency component $Fd(n, k)$ indicates, of the signals received from a position at a distance given by k×"range increment", a frequency component (represented by a complex number) corresponding to the Doppler frequency having the number n.

As described above, the Doppler-frequency analyzer 521 performs Doppler frequency analysis on the data (Cl(1, k), Cl(2, k), ..., Cl(M, k)) for one frame, that is, for the kth range bin for M cycles. As a result, M Doppler frequency components (Fd(1, k), Fd(2, k), ..., Fd(M, k)) are obtained for each range bin.

An increment $\Delta f$ of the obtained Doppler frequency components is determined by the number of cycles, M, for one frame and intervals $\Delta t$ of the cycle. When Doppler frequency analysis is performed using FFT, the increment $\Delta f$ of the Doppler frequency components is given by, for example, equation (4):

$$\Delta f = \frac{1}{M \cdot \Delta t} \quad (4)$$

The Doppler-frequency analyzer 521 can also determine the Doppler speed of an object, based on the Doppler frequency increment $\Delta f$ and, for example, by using equation (5):

$$\Delta v = \frac{\lambda}{2} * \Delta f \quad (5)$$

The Doppler-frequency analyzer 521 outputs, as Doppler frequency data, a series of data calculated for respective combinations of range bins and Doppler frequencies (i.e., for respective combination of distances and speeds).

FIG. 14 is a table illustrating one example of the configuration of the Doppler frequency data output by the Doppler-frequency analyzer 521.

As illustrated in FIG. 14, Doppler frequency data 640 has, for each range bin, Doppler frequency components Fd(1, k) to Fd(M, k) of first to Mth Doppler frequencies. That is, the Doppler frequency data 640 for each range bin is data indicating changes in Doppler frequency power, as described above and illustrated in FIG. 13.

<Normalized Direction Correlation Values and Direction Correlation Power Values>

A Doppler frequency component output from the ith Doppler-frequency analyzer 521i is represented by $Fd_i(n, k)$. In this case, for combinations of Doppler frequencies and distances (the distances from the radar apparatus to an object), Doppler frequency components $Fd_1(n, k)$ to $Fd_4(n, k)$ corresponding to the first to fourth receiving antenna elements $511_1$ to $511_4$ are represented using a correlation vector $h(n, k)$. The correlation vector $h(n, k)$ is given by equation (6):

$$h(n, k) = \begin{bmatrix} Fd_1(n, k) \\ Fd_2(n, k) \\ Fd_3(n, k) \\ Fd_4(n, k) \end{bmatrix} \quad (6)$$

Based on the correlation vector $h(n, k)$, the arrival-direction estimator 540 estimates an angle $\theta$ (see FIG. 8) indicating the arrival direction of an echo signal.

As described above, the phase difference between a reception signal of the ith receiving antenna element $511_i$ and a reception signal of the first receiving antenna element $511_1$ is $2\pi d_i \sin\theta/\lambda$. In this case, for each azimuth of interest, complex number responses of the first to fourth receiving antenna elements $511_1$ to $511_4$ that constitute the array antenna are represented using a direction vector $a(\theta_u)$. The ideal direction vector $a(\theta_u)$ without a phase deviation and an amplitude deviation between the receiving antenna elements 511 is given by equation (7):

$$a(\theta_u) = \begin{bmatrix} 1 \\ e^{j2\pi d_2 \sin\theta_u/\lambda} \\ e^{j2\pi d_3 \sin\theta_u/\lambda} \\ e^{j2\pi d_4 \sin\theta_u/\lambda} \end{bmatrix} \quad (7)$$

where $\theta_u$ indicates an azimuth when the radar apparatus 200 is a reference, and is a variable that changes at a predetermined interval $\Delta\theta$ in an estimated range $[\theta_{min}\text{-}\theta_{max}]$ of directions from which echo signals arrive at the radar apparatus 200. The azimuth $\theta_u$ is given, for example, by equation (8):

$$\theta_u = \theta_{min} + u\Delta\theta \qquad (8)$$

where u takes an integer from 0 to NU. NU is given by, for example, equation (9):

$$NU = \text{floor}\left[\frac{\theta_{max} - \theta_{min}}{\Delta\theta}\right] + 1 \qquad (9)$$

where floor[y] indicates a function for outputting a largest integer value that does not exceed a real number y.

The direction vector $a(\theta_u)$ is pre-measured, for example, in a radio wave darkroom. The direction vector $a(\theta_u)$ is a value obtained by taking into account coupling between the first to fourth receiving antenna elements $511_1$ to $511_4$ and deviation information of amplitude error and phase error, in addition to phase difference information geometrically computed according to the intervals of the first to fourth receiving antenna elements $511_1$ to $511_4$.

With respect to each combination of the azimuth $\theta_u$, the range bin, and the Doppler frequency, the normalized direction correlation-value calculator 542 calculates a normalized direction correlation value $N\_R_{out}(k, n, \theta_u)$, for example, by using equation (10):

$$N\_R_{out}(k, n, \theta_u) = \frac{|a(\theta_u)^H h(k, n)|^2 / a(\theta_u)^H a(\theta_u)}{h(k, n)^H h(k, n)} \qquad (10)$$

Also, with respect to each combination of the azimuth $\theta_u$, the range bin, and the Doppler frequency, the direction correlation power-value calculator 541 calculates a direction correlation power value $F_{out}(k, n, \theta_u)$, for example, by using equation (11):

if $N\_R_{out}(k,n,\theta_u) > Th1$, $F_{out}(k,n,\theta_u) = |a(\theta_u)^H h(k,n)|^2$ else $F_{out}(k,n,\theta_u) = 0$ (11)

As can be understood from equation (10), the normalized direction correlation value $N\_R_{out}(k, n, \theta_u)$ is a value obtained by normalizing an inner product of the direction vector $a(\theta_u)$ and the correlation vector $h(n, k)$ by using the value of the correlation vector $h(n, k)$. Such a normalized direction correlation value $N\_R_{out}(k, n, \theta_u)$ takes a real number between 0 and 1, and the closer to 1 the normalized direction correlation value $N\_R_{out}(k, n, \theta_u)$ is, the higher the degree of the correlation between the correlation vector $h(n, k)$ and the direction vector $a(\theta_u)$ is. That is, in the case of a one-wave model (it is assumed that one frequency component n exists at the range bin k), the normalized direction correlation value $N\_R_{out}(k, n, \theta_u)$ indicates the probability (the level of a certainty factor) that an echo signal arrives from the azimuth $\theta_u$.

Also, as can be understood from equation (11), the direction correlation power value $F_{out}(k, n, \theta_u)$ is an inner product of the direction vector $a(\theta_u)$ and the correlation vector $h(n, k)$ when the normalized direction correlation value is larger than a threshold Th1. Such a direction correlation power value $F_{out}(k, n, \theta_u)$ indicates the power of an echo signal that arrives from the direction of the azimuth $\theta_u$, taking into account the degree of correlation between the correlation vector $h(n, k)$ and the direction vector $a(\theta_u)$.

The direction correlation power-value calculator 541 outputs the calculated series of direction correlation power values $F_{out}(k, n, \theta_u)$ to the object detector 553 as the direction correlation power-value data. The normalized direction correlation-value calculator 542 also outputs the calculated series of normalized direction correlation values $N\_R_{out}(k, n, \theta_u)$ to the object separator 554 as the normalized direction correlation-value data.

Figure 15:
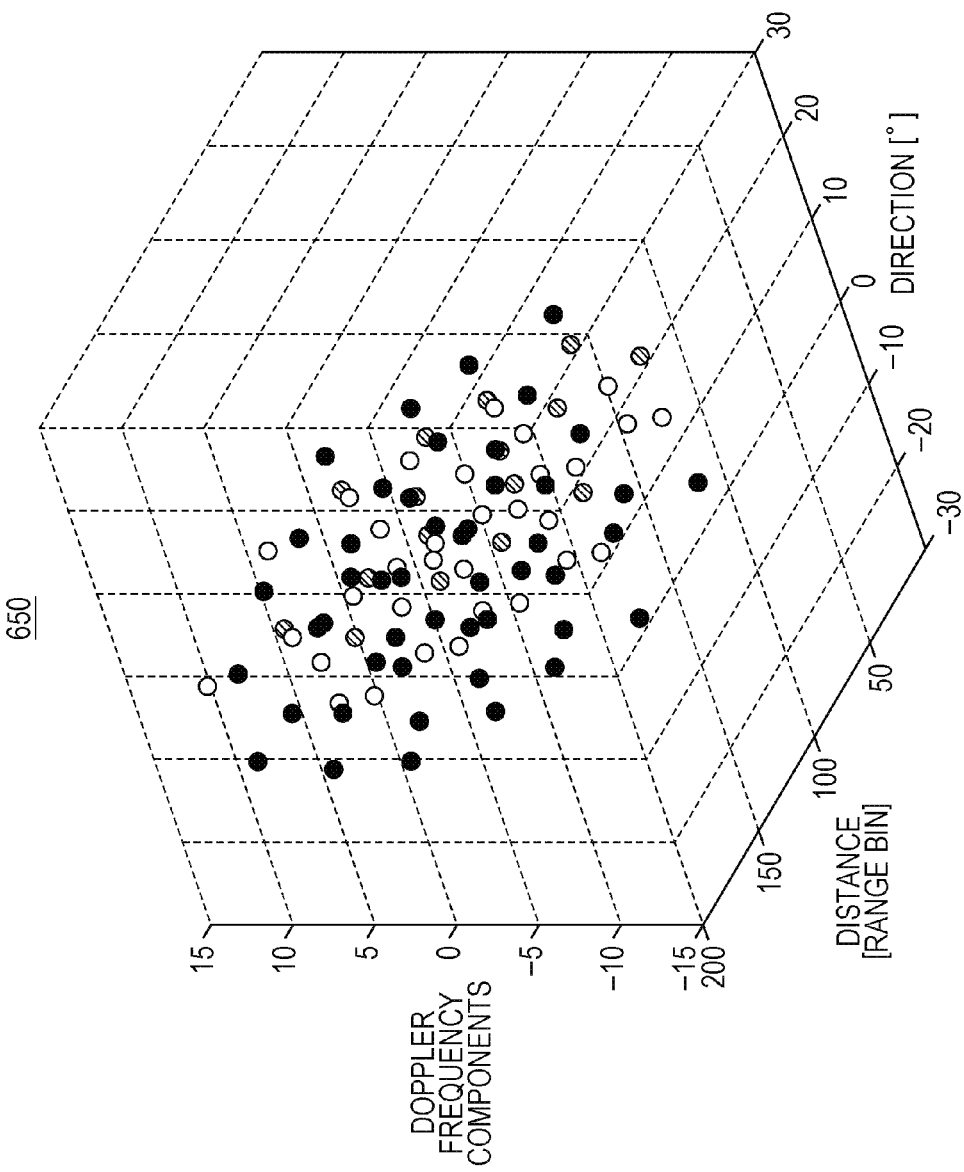
FIG. 15 illustrates one example of a three-dimensional plot of normalized direction correlation-value data in the present embodiment.

FIG. 15 illustrates one example of a three-dimensional plot of the normalized direction correlation-value data. In FIG. 15, the color densities of dots indicate the magnitudes of the normalized direction correlation value $N\_R_{out}(k, n, \theta_u)$. The darker dot color indicates that the normalized direction correlation value $N\_R_{out}(k, n, \theta_u)$ is larger.

As illustrated in FIG. 15, normalized direction correlation-value data 650 has the normalized direction correlation values $N\_R_{out}(k, n, \theta_u)$ for respective combinations of the distances (the range bin, k), the directions $\theta_u$, and the Doppler frequencies (n). In FIG. 15, the normalized direction correlation values $N\_R_{out}(k, n, \theta_u)$ that are smaller than or equal to a predetermined value are not illustrated. The normalized direction correlation values $N\_R_{out}(k, n, \theta_u)$ are thus constituted by a sequence of K×M×NU normalized direction correlation values (see equation (9) for NU).

Similarly, the direction correlation power-value data is also constituted by a sequence of K×M×NU direction correlation power values.

<Features of Normalized Direction Correlation-Value Data and Direction Correlation Power-Value Data>

Figure 16:
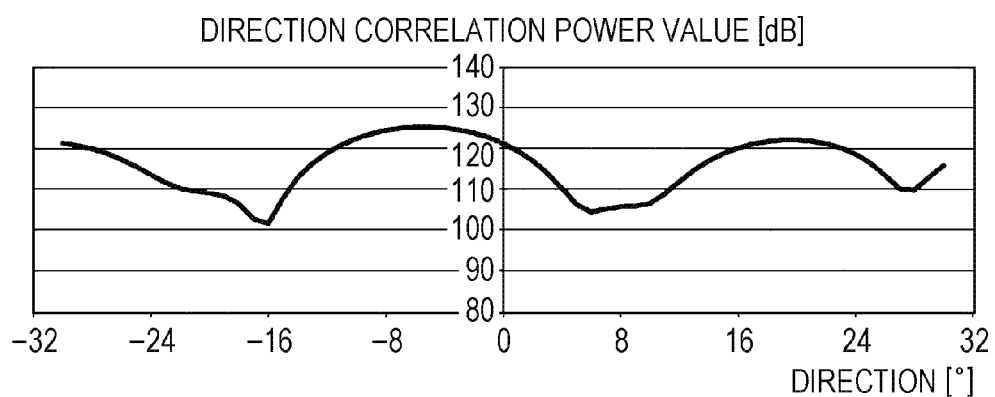
FIG. 16 is a graph illustrating, in the present embodiment, one example of a relationship between a direction and a direction correlation power value with respect to a maximum-power Doppler frequency component at a range bin where a pedestrian is present.
Figure 17:
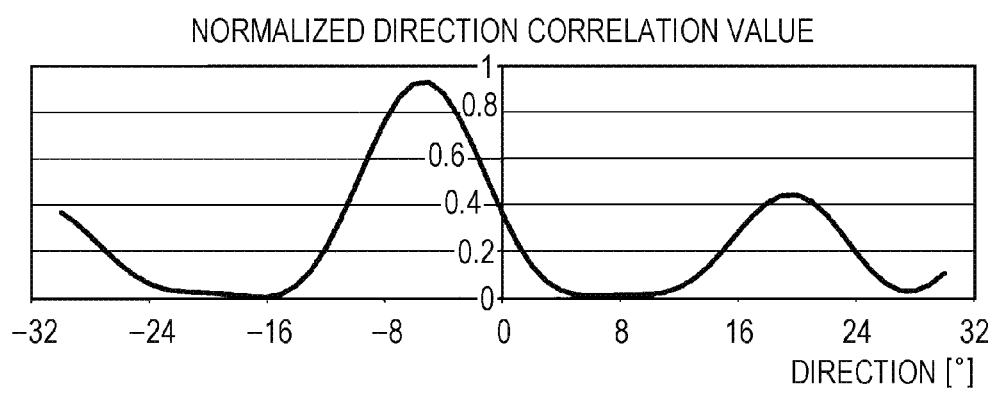
FIG. 17 is a graph illustrating, in the present embodiment, one example of a relationship between a direction and a normalized direction correlation value with respect to a maximum-power Doppler frequency component at the range bin where the pedestrian is present.
Figure 18:
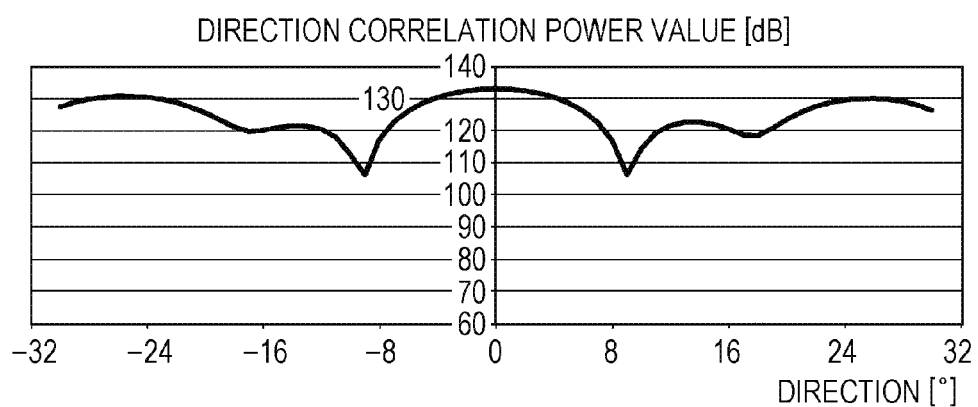
FIG. 18 is a graph illustrating, in the present embodiment, one example of a relationship between a direction and a direction correlation power value with respect to a maximum-power Doppler frequency component at a range bin where no object is present.
Figure 19:
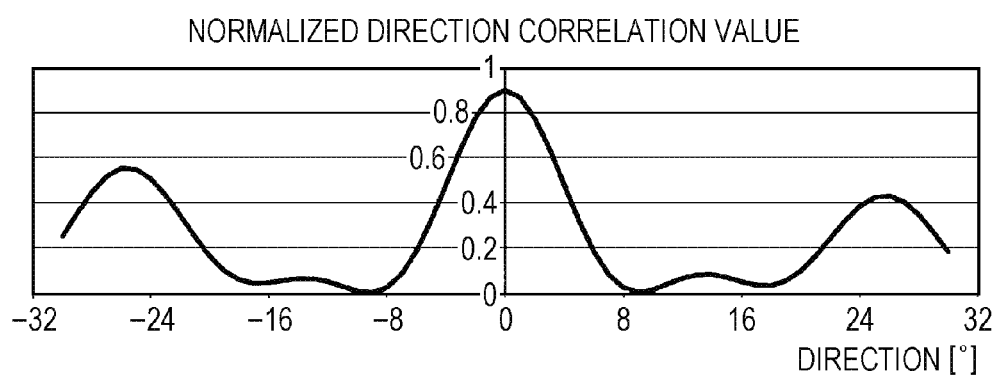
FIG. 19 is a graph illustrating, in the present embodiment, one example of a relationship between a direction and a normalized direction correlation value with respect to the maximum-power Doppler frequency component at the range bin where no object is present.

FIG. 16 is a graph illustrating one example of a relationship between a direction and a direction correlation power value with respect to a maximum-power Doppler frequency component at a distance (a range bin) where a pedestrian is present. FIG. 17 is a graph illustrating one example of a relationship between a direction and a normalized direction correlation value with respect to a maximum-power Doppler frequency component at the distance (the range bin) where the pedestrian is present. FIG. 18 is a graph illustrating one example of a relationship between a direction and a direction correlation power value with respect to a maximum-power Doppler frequency component at a distance (range bin) where no object is present. FIG. 19 is a graph illustrating one example of a relationship between a direction and a normalized direction correlation value with respect to the maximum-power Doppler frequency component at the distance (range bin) where no object is present.

In FIGS. 16 and 18, the horizontal axis indicates a direction, and the vertical axis indicates a direction correlation power value. In FIGS. 17 and 19, the horizontal axis indicates a direction, and the vertical axis indicates a normalized direction correlation value.

In FIG. 16, the direction correlation power value for the Doppler frequency component exhibits a peak in the direction of about −5°. However, since the waveform is not steep, the arrival direction of an echo signal can roughly be estimated.

On the other hand, in FIG. 17, the normalized direction correlation value for a maximum Doppler frequency component exhibits a peak with a steep waveform in the direction of about −5°. As described above, the normalized direction correlation-value data has a feature that it indicates the arrival direction of an echo signal with high accuracy.

Figure 20:
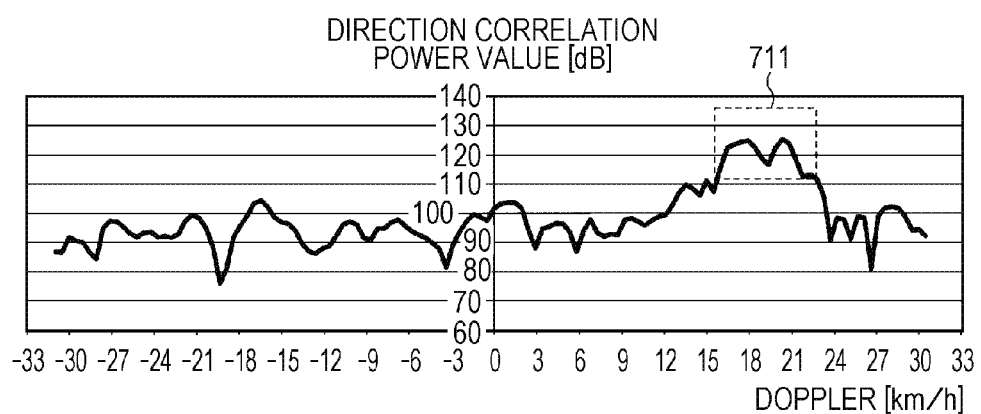
FIG. 20 is a graph illustrating, in the present embodiment, one example of a relationship between a Doppler speed and a direction correlation power value with respect to a cell where a pedestrian is present.
Figure 21:
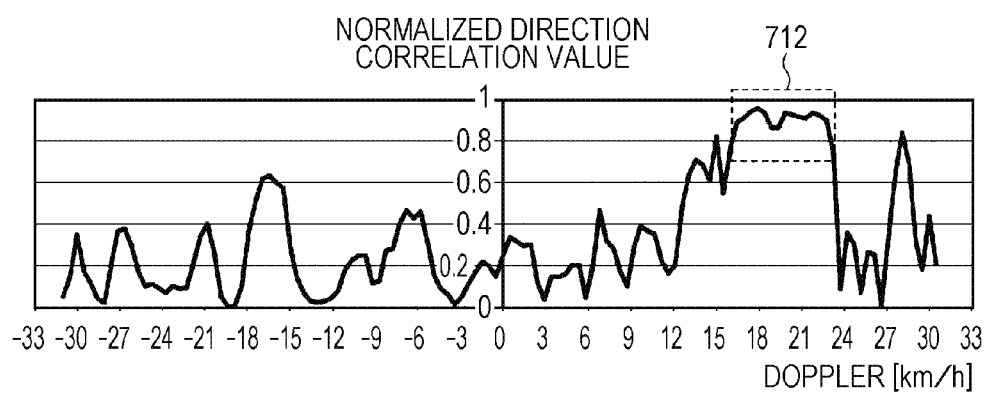
FIG. 21 is a graph illustrating, in the present embodiment, one example of a relationship between a Doppler speed and a normalized direction correlation value with respect to the cell where the pedestrian is present.
Figure 22:
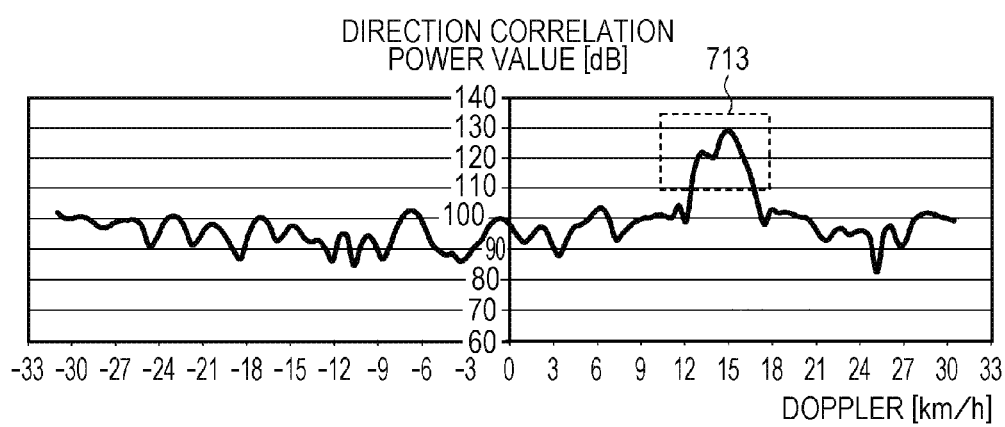
FIG. 22 is a graph illustrating, in the present embodiment, one example of a relationship between a Doppler speed and a direction correlation power value with respect to a cell where no object is present.
Figure 23:
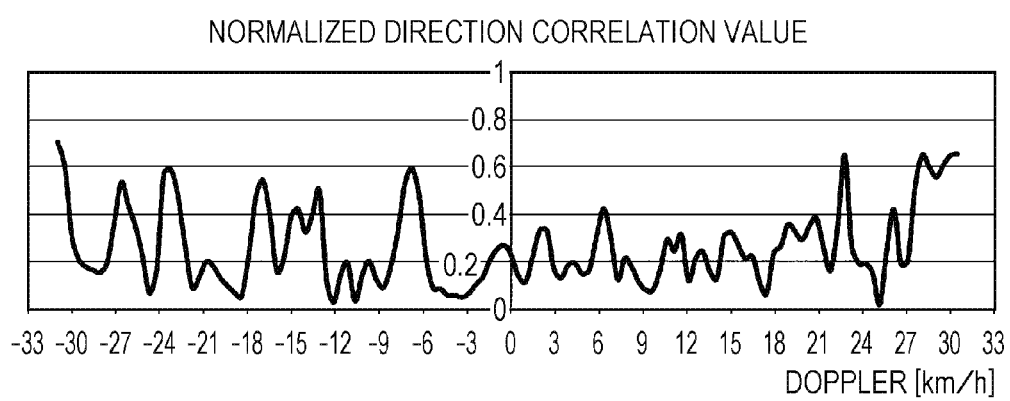
FIG. 23 is a graph illustrating, in the present embodiment, one example of a relationship between a Doppler speed and a normalized direction correlation value with respect to the cell where no object is present.

FIG. 20 is a graph illustrating one example of the direction correlation power-value data for a cell where a pedestrian is present. FIG. 21 is a graph illustrating one example of the normalized direction correlation-value data for the cell where the pedestrian is present. FIG. 22 is a graph illustrating one example of the direction correlation power-value data for a cell (background cell) where no object is present. FIG. 23 is a graph illustrating one example of the normalized direction correlation-value data for the cell where no object is present.

The term "cell" as used herein refers to a small region that is obtained by sectioning an area on which the radar apparatus 200 performs object sensing and that is defined by, for example, a combination of a range (k) and an azimuth (θ). In FIGS. 20 and 22, the horizontal axis indicates a Doppler speed, and the vertical axis indicates a direction correlation power value. In FIGS. 21 and 23, the horizontal axis indicates a Doppler speed, and the vertical axis indicates a normalized direction correlation value.

As illustrated in a rectangular region 711 in FIG. 20 and a rectangular region 712 in FIG. 21, at the cell where the pedestrian is present, both the direction correlation power value and the normalized direction correlation value have large values at a certain Doppler frequency.

On the other hand, as illustrated in a rectangular region 713 in FIG. 22, a Doppler frequency band in which the direction correlation power value continuously exhibits a high value also exists at the cell where no object is present. However, at the cell where no object is present, the normalized direction correlation value does not increase at any Doppler frequency, as illustrated in FIG. 23.

Figure 24:
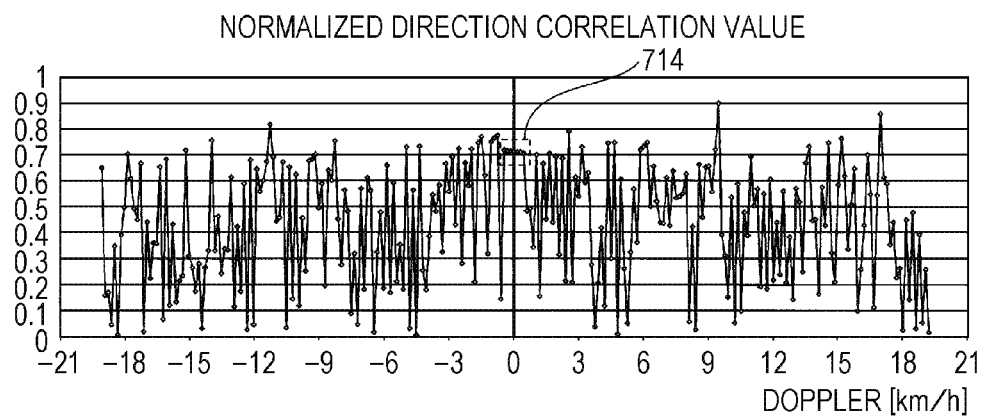
FIG. 24 is a graph illustrating, in the present embodiment, one example of a relationship between a Doppler speed and a normalized direction correlation value with respect to a cell where a vehicle is present.
Figure 25:
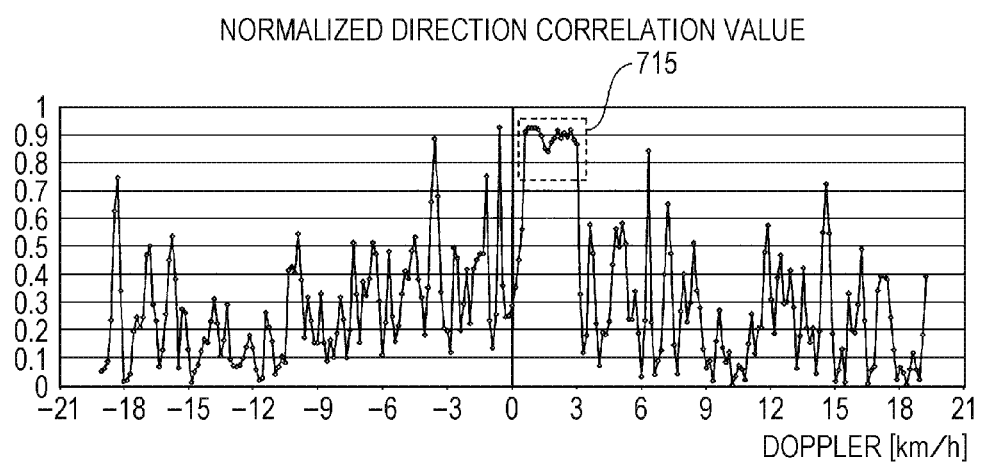
FIG. 25 is a graph illustrating, in the present embodiment, another example of the relationship between the Doppler speed and the normalized direction correlation value with respect to the cell where the pedestrian is present.

FIG. 24 is a graph illustrating one example of the normalized direction correlation-value data for a cell where a vehicle is present. FIG. 25 is a graph illustrating another example of the normalized direction correlation-value data for a cell where a pedestrian is present. In FIGS. 24 and 25, the horizontal axis indicates a Doppler speed, and the vertical axis indicates a normalized direction correlation value.

As illustrated in a rectangular region 714 in FIG. 24 and a rectangular region 715 in FIG. 25, a Doppler frequency range in which the normalized direction correlation-value continuously exhibits a large value exists at the cell where the object, such as the pedestrian or the vehicle, is present.

However, comparison between rectangular regions 714 and 715 shows that normalized direction correlation value for the cell in which the pedestrian is present has a larger value over a wider Doppler frequency range than that of the normalized direction correlation value for the cell in which the vehicle is present. This is due to the above-described human characteristic that Doppler spread of the human is greater than those of vehicles and buildings. Also, the normalized direction correlation value for the cell where the pedestrian is present is larger than the normalized direction correlation value for the cell in which the vehicle is present. This is due to a human characteristic that reflected signals arrive from a narrower direction, since the human is smaller than the vehicle.

Thus, normalized direction correlation-value data has a feature of indicating the degree of Doppler spread of an object and the size of the object.

The radar apparatus 200 has limits of a distance resolution and a direction resolution. Thus, data for each range bin in the delay profile is a result of adding up reflected waves from a large number of reflection points. Thus, the values and the waveform of the normalized direction correlation-value data differ depending on the size and the shape of an object. With this characteristic, a plurality of objects can be separated and can be individually sensed.

<Shrinking of Normalized Direction Correlation-Value Data and Direction Correlation Power-Value Data>

The direction correlation power data and the normalized direction correlation-value data are data that state values for respective combinations of ranges, directions, and Doppler frequencies. When the range increment is 20 cm, the number of range bins, K, exceeds 100 in order to measure up to 20 m. When a wide-angle radar (e.g., ±60°) has a direction increment of 1°, the number of azimuths, NU, is 121. When the frequency analysis is performed using 256DFT, the number of Doppler frequencies, M, is 256.

Thus, each of the direction correlation power data and the normalized direction correlation-value data is 100×121×256 three-dimensional (3D) data, and when the object sensing processing is to be performed directly using the 3D data, enormous processing cost is involved.

Accordingly, the power-value-data shrinker 551 shrinks the 3D direction correlation power data to 2D direction correlation power data including at least a Doppler frequency axis. Similarly, the correlation-value-data shrinker 552 shrinks the 3D normalized direction correlation-value data to 2D normalized direction correlation-value data including at least a Doppler frequency axis.

More specifically, the power-value-data shrinker 551 calculates the values of the 2D direction correlation power data (a 2D power profile) for the range-Doppler frequency by using, for example, equation (12):

$$F_{s\_out}(k, n) = \sum_{u=0}^{NU} F_{out}(k, n, \theta_u) \qquad (12)$$

Each value calculated using equation (12) is a value obtained by adding direction correlation power values for each range bin and each Doppler frequency with respect to a noise-less direction (i.e., the arrival direction of a reflected signal). The term "noise-less direction" as used herein refers to a direction in which, with respect to a predetermined direction and a range, the number of portions where the normalized direction correlation value of a Doppler component of interest is continuously stable and is larger than a threshold "1" is larger than a predetermined number. For example, in FIG. 25, although there are many Doppler speeds at which the normalized direction correlation value is 0.8 or more, Doppler speeds at which the normalized direction correlation value for the adjacent Doppler speed decreases significantly are processed as noise and are not added.

Alternatively, the power-value-data shrinker 551 may calculate the values of the 2D direction correlation power data by using, for example, equation (13):

$$F_{s\_out}(k,n)=\max\{F_{out}(k,n,\theta_u)|u=0,\ldots,NU\} \qquad (13)$$

Each value calculated using equation (13) is the maximum value of the direction correlation power value for each range bin and each Doppler frequency with respect to a noise-less direction (the arrival direction of a reflected signal).

NU+1 is the number of azimuths at which the arrival direction is to be estimated.

The power-value-data shrinker 551 may also generate, for example, 2D direction correlation power data for the direction—Doppler frequency. That is, the power-value-data shrinker 551 may use, as the values of the 2D direction correlation power data, addition values or maximum values of the direction correlation power values for the respective azimuths and the respective Doppler frequencies with respect to a range bin that is not noise.

The correlation-value-data shrinker 552 also calculates the values of the 2D normalized direction correlation-value data (a 2D normalized direction correlation-value profile) for the range—Doppler frequency, by using, for example, equation (14):

$$\text{if } \max\{N\_R_{out}(k,n,\theta_u)|u=0,\ldots,NU\} > Th2$$

$$N\_R_{s\_out}(k,n) = \max\{N\_R_{out}(k,n,\theta_u)|u=0,\ldots,NU\}$$

$$\text{else } N\_R_{s\_out}(k,n) = 0 \quad (14)$$

The 2D normalized direction correlation-value data generated using equation (14) includes the maximum values of normalized direction correlation values for the respective range bins and the respective Doppler frequencies with respect to a noise-less direction (the arrival direction of a reflected signal).

Alternatively, for example, the correlation-value-data shrinker 552 may determine the direction number of a direction in which the normalized direction correlation value is a maximum value by using equation (15) below and may use the determined direction number as a value for the 2D normalized direction correlation-value data.

$$\text{if } N\_R_{out}(k,n,\theta_u) > Th2 \text{ and}$$

$$N\_R_{out}(k,n,\theta_u) = \max\{N\_R_{out}(k,n,\theta_u)|u=0,\ldots,NU\}$$

$$N\_R_{s\_out}(k,n) = u$$

$$\text{else NULL} \quad (15)$$

When the power-value-data shrinker 551 generates 2D direction correlation power data for the direction—Doppler frequency, the correlation-value-data shrinker 552 generates 2D normalized direction correlation-value data for the direction—Doppler frequency. That is, the correlation-value-data shrinker 552 may use, as the values of the 2D normalized direction correlation-value data, the maximum value of the normalized direction correlation-values for each azimuth and each Doppler frequency or the range number for a direction in which the maximum value is obtained, with respect to a range bin that is not noise.

<Operation of Radar Apparatus>

Next, a description will be given of the operation of the radar apparatus 200.

Figure 26:
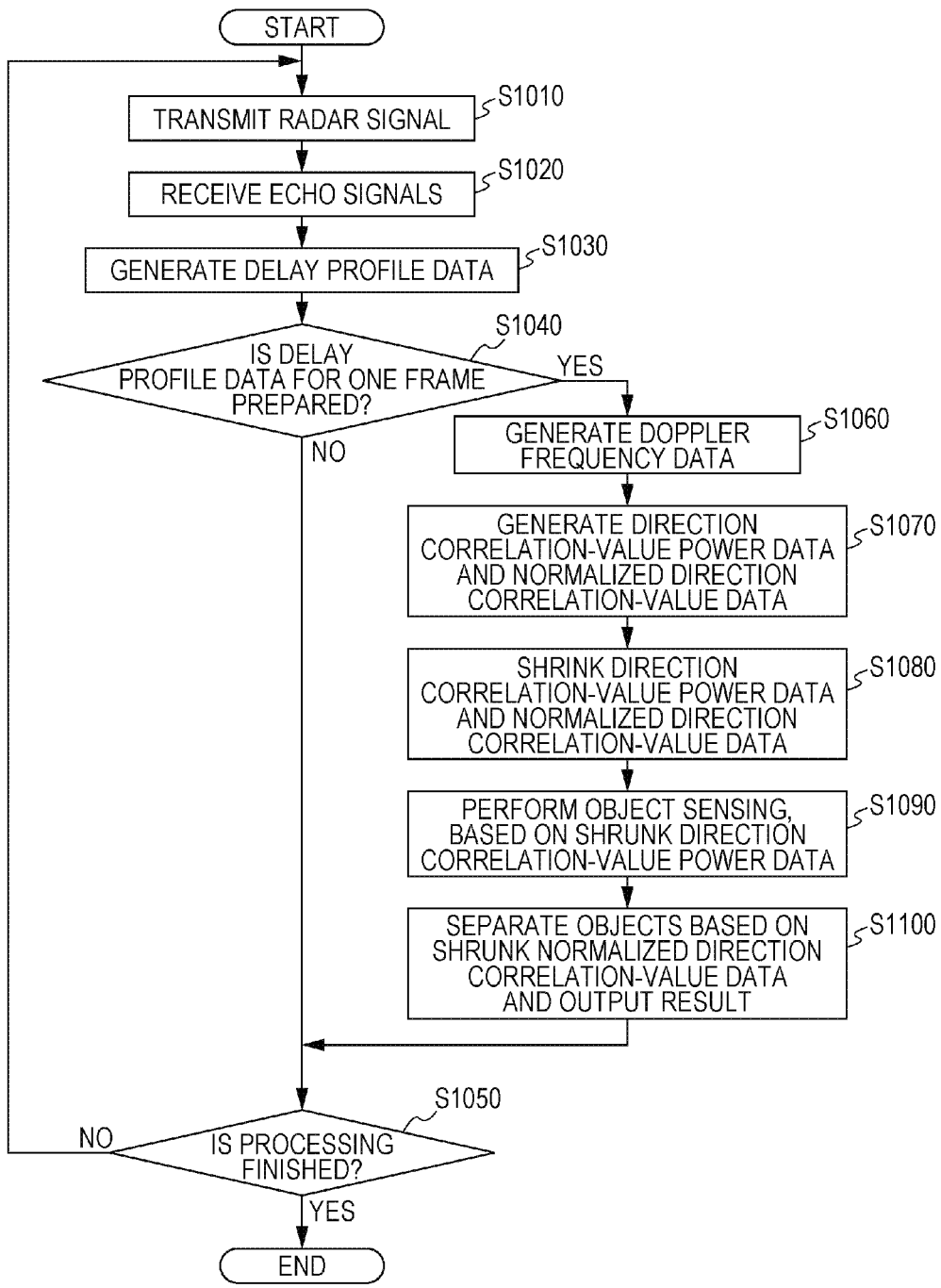
FIG. 26 is a flowchart illustrating one example of the operation of the radar apparatus according to the present embodiment.

FIG. 26 is a flowchart illustrating one example of the operation of the radar apparatus 200.

In step S1010, the radar transmitter 400 generates a radar signal and transmits the radar signal via the transmitting antenna 423.

In step S1020, the receiving antenna elements 511 in the radar receiver 500 receive echo signals.

In step S1030, the delay-profile generators 512 generate delay profile data, based on the echo signals received by the corresponding receiving antenna elements 511.

In step S1040, each of the Doppler-frequency analyzers 521 determines whether or not delay profile data for a new frame has been prepared. When delay profile data for a new frame has not been prepared (NO in S1040), each Doppler-frequency analyzer 521 advances the process to step S1050. When delay profile data for a new frame has been prepared (YES in S1040), each Doppler-frequency analyzer 521 advances the process to step S1060.

In step S1050, the radar transmitter 400 determines whether or not an instruction for finishing the object sensing processing is given by a user operation or like. When the instruction for finishing the object sensing processing is not given (NO in S1050), the radar transmitter 400 returns the process to step S1010. The processes in steps S1010 to S1050 are executed, for example, for each cycle described above.

In step S1060, each Doppler-frequency analyzer 521 generates Doppler frequency data, based on the prepared delay profile data for the new frame.

In step S1070, the direction correlation power-value calculator 541 generates direction correlation-value power data, based on the generated Doppler frequency data. The normalized direction correlation-value calculator 542 also generates normalized direction correlation-value data, based on the generated Doppler frequency data.

In step S1080, the power-value-data shrinker 551 shrinks the generated 3D direction correlation-value power data to 2D direction correlation-value power data. The correlation-value-data shrinker 552 also shrinks the generated 3D normalized direction correlation-value data to 2D normalized direction correlation-value data.

In step S1090, the object detector 553 performs object sensing, based on the shrunk direction correlation-value power data.

In step S1100, when a group of adjacent objects is sensed, the object separator 554 separates the objects and senses the objects, based on the shrunk normalized direction correlation-value data. The object separator 554 outputs a result of the sensing and advances the process to step S1050.

Upon receiving an instruction for finishing the processing (YES in S1050), the radar transmitter 400 finishes the series of processing.

Through such an operation, the radar apparatus 200 can continuously perform processing for distinctively detecting an object having large Doppler spread and an object having small Doppler spread.

As described above, the radar apparatus 200 according to the present embodiment senses an object that reflects the radar signal, based on the direction correlation power-value data and the normalized direction correlation-value data. That is, by using the indices that are different from the reflected signal power, the radar apparatus 200 according to the present embodiment overcomes the problem that cannot be overcome by the related art.

Thus, the radar apparatus 200 according to the present embodiment can distinctively detect an object having large Doppler spread, such as a human, and an object having small Doppler spread, such as a vehicle. Accordingly, the radar apparatus 200 according to the present embodiment can more reliably sense each of a plurality of objects, compared with the related art. Such sensing can also be performed, even when those objects are significantly close to each other.

The radar apparatus 200 according to the present embodiment shrinks the direction correlation power-value data and the normalized direction correlation-value-data to data for combinations of Doppler frequencies and at least one of distances from the radar apparatus to an object and the arrival directions of echo signals. Thus, the radar apparatus 200 according to the present embodiment can reduce the processing load and can realize the above-described object sensing at lower cost and at higher speed.

The direction correlation power values and the normalized direction correlation values are not limited to the above-described values. The direction correlation power values may be any information indicating the strengths of echo signals with respect to combinations of Doppler frequencies and at least one of the distances to an object and the arrival directions of the echo signals. That is, each direction correlation power value may be any information that indicates the degree of the probability that an object is present at each position. Each normalized direction correlation value may be any information that indicates the probability of the arrival direction of an echo signal for each combination.

A portion of the configuration of the radar apparatus 200 may be isolated from another portion, for example, may be provided in an external device, such as a server, on a network. In this case, the radar apparatus 200 needs to have an information output unit, such as a communication unit, for communicating with the external device.

For example, the object detector 553 and the object separator 554 (see FIG. 5) may be arranged outside the radar apparatus 200. In addition, the power-value-data shrinker 551 and the correlation-value-data shrinker 552 may also be arranged outside the radar apparatus 200. When no data is to be shrunk, the power-value-data shrinker 551 and the correlation-value-data shrinker 552 may be eliminated.

A specific aspect of the present disclosure is not limited to the contents described in the above embodiment. It is apparent to those skilled in art that various variations and modifications can be conceived within the scope recited in the claims, and it is to be understood that such variations and modifications also naturally belong to the technical scope of the present disclosure.

SUMMARY OF PRESENT DISCLOSURE

A radar apparatus of the present disclosure includes an antenna that receives echo signals, each of the echo signals being a radar signal reflected by one or more objects; a Doppler-frequency acquirer that acquires Doppler frequencies at each range from the received echo signals; a direction correlation power-value calculator that calculates direction correlation power values for respective combinations of the Doppler frequencies and at least one of a distance to the object and an arrival direction of the echo signals, each direction correlation power value indicating a strength of a corresponding echo signal; and a normalized direction correlation-value calculator that calculates, for the respective combinations, normalized direction correlation values, each indicating a probability of the arrival direction of the corresponding echo signal.

The radar apparatus may further include an object sensor that senses the object that reflects the radar signal, based on the direction correlation power values and the normalized direction correlation values.

In the radar apparatus, the object may include a first object and a second object; and the object sensor may include an object detector that detects a region in which the first object and the second object that reflect the radar signal are located, based on the direction correlation power values; and an object separator that separates the region into a first region in which the first object is located and a second region in which the second object is located, based on whether or not a width of spread of the Doppler frequency at which the normalized direction correlation value exceeds a first threshold exceeds a second threshold.

In the radar apparatus, the first object may include a vehicle, and the second object may include a human. In addition, the object separator may determine to portion of the region as the second region, the portion being an area where the width of the spread of the Doppler frequency exceeds the second threshold.

In the radar apparatus, the antenna may be an array antenna consisting of a plurality of antenna elements; the Doppler-frequency acquirer may acquire Doppler frequencies in each region from the received echo signals, for each of the plurality of respective antenna elements; and by using a relative positional relationship of the plurality of antenna elements, the normalized direction correlation-value calculator may calculate the normalized direction correlation values, based on the received echo signals.

In the radar apparatus, the direction correlation power-value calculator may calculate an inner product of a direction vector and a correlation vector as each of the direction correlation power values. The direction vector indicates complex number responses of the plurality of antenna elements for each combination of a Doppler frequency, the distance, and the arrival direction, when the echo signals arrive from the arrival direction, and the correlation vector indicates components of the received echo signals for each combination of the Doppler frequency and the distance. The normalized direction correlation-value calculator may calculate, as the normalized direction correlation value, a value obtained by normalizing the inner product by using a value of the correlation vector, for each combination of the Doppler frequency, the distance, and the arrival direction.

The radar apparatus may further include a power-value-data shrinker that compresses a predetermined component of a distance component and a direction component in direction correlation power-value data including the direction correlation power values corresponding to combinations of the Doppler frequencies, the distances, and the arrival directions; and a correlation-value-data shrinker that compresses the predetermined component in normalized direction correlation-value data including the normalized direction correlation values corresponding to the combinations. The object detector may detect the region, based on the direction correlation power-value data on which the compression was performed, and the object separator may separate the region into the first region and the second region, based on the normalized direction correlation-value data on which the compression was performed.

An object sensing method according to the present disclosure includes: receiving echo signals, each of the echo signals being a radar signal reflected by an object; acquiring Doppler frequencies at each range from the received echo signals; calculating direction correlation power values for respective combinations of the Doppler frequencies and at least one of a distance from a radar apparatus to the object and an arrival direction of the echo signals, each direction correlation power value indicating a strength of a corresponding echo signal; calculating, for the respective combinations, normalized direction correlation values, each indicating a probability of the arrival direction of the corresponding echo signal; and sensing the object that reflects the radar signal, based on the direction correlation power values and the normalized direction correlation values.

The present disclosure is useful as a radar apparatus and an object sensing method that can more reliably sense each of a plurality of objects. In particular, the present disclosure is preferably used as a radar apparatus for improving the performance of a safety system in a transportation environment.

What is claimed is:
1. A radar apparatus comprising:
an antenna that receives echo signals, each echo signal being a radar signal reflected by one or more objects;
a Doppler-frequency acquirer that acquires Doppler frequencies at each range from the received echo signals;
a direction correlation power-value calculator that calculates direction correlation power values for respective combinations of the Doppler frequencies and at least one of a distance to the one or more objects and an arrival direction of the echo signals, each direction correlation power value indicating a strength of a corresponding echo signal; and a normalized direction correlation-value calculator that calculates, for the respective combinations, normalized direction correlation values, each normalized direction correlation value indicating a probability of the arrival direction of the corresponding echo signal.

2. The radar apparatus according to claim 1, further comprising:

an object sensor that senses the at least one object that reflects the radar signal, based on the direction correlation power values and the normalized direction correlation values.

3. The radar apparatus according to claim 2, wherein the one or more objects includes a first object and a second object; and wherein the object sensor includes:

an object detector that detects a range in which the first object and the second object that reflect the radar signal are located, based on the direction correlation power values; and an object separator that separates the region into a first region in which the first object is located and a second region in which the second object is located, based on whether or not a width of spread of the Doppler frequency at which the normalized direction correlation value exceeds a first threshold exceeds a second threshold.

4. The radar apparatus according to claim 3, wherein the first object includes a vehicle, and the second object includes a human, and the object separator determines a portion of the region as the second region, the portion being an area where the width of the spread of the Doppler frequency exceeds the second threshold.

5. The radar apparatus according to claim 4, wherein the antenna is an array antenna consisting of a plurality of antenna elements;

wherein the Doppler-frequency acquirer acquires Doppler frequencies in each range from the received echo signals, for each of the plurality of antenna elements; and wherein, by using a relative positional relationship of the plurality of antenna elements, the normalized direction correlation-value calculator calculates the normalized direction correlation values, based on the received echo signals.

6. The radar apparatus according to claim 5, wherein the direction correlation power-value calculator calculates an inner product of a direction vector and a correlation vector as each of the direction correlation power values, the direction vector indicating complex responses of the plurality of antenna elements for each combination of a Doppler frequency, the distance, and the arrival direction, when the echo signals arrive from the arrival direction, and the correlation vector indicating components of the received echo signals for each combination of the Doppler frequency and the distance; and the normalized direction correlation-value calculator calculates, as the normalized direction correlation value, a value obtained by normalizing the inner product by using a value of the correlation vector, for each combination of the Doppler frequency, the distance, and the arrival direction.

7. The radar apparatus according to claim 6, further comprising:

a power-value-data shrinker that compresses a predetermined component of a distance component and a direction component in direction correlation power-value data including the direction correlation power values corresponding to combinations of the Doppler frequencies, the distances, and the arrival directions; and a correlation-value-data shrinker that compresses the predetermined component in normalized direction correlation-value data including the normalized direction correlation values corresponding to the combinations, wherein the object detector detects the region, based on the direction correlation power-value data on which the compression was performed, and the object separator separates the region into the first region and the second region, based on the normalized direction correlation-value data on which the compression was performed.

8. An object sensing method comprising:

receiving echo signals, each of the echo signals being a radar signal reflected by one or more objects;

acquiring Doppler frequencies at each range from the received echo signals;

calculating direction correlation power values for respective combinations of the Doppler frequencies and at least one of an distance from a radar apparatus to the object and an arrival direction of the echo signals, each direction correlation power value indicating a strength of a corresponding echo signal; and calculating, for the respective combinations, normalized direction correlation values, each indicating a probability of the arrival direction of the corresponding echo signal.

* * * * *